United States Patent
Hwang et al.

(10) Patent No.: US 10,084,827 B2
(45) Date of Patent: Sep. 25, 2018

(54) METHODS AND APPARATUS FOR REGISTERING A DEVICE TO SERVER

(75) Inventors: Changhwan Hwang, Seoul (KR);
Sahnghee Bahn, Gyeonggi-do (KR);
Sungsoo Hong, Seoul (KR)

(73) Assignee: Samsung Electronics Co., Ltd (KR)

( * ) Notice: Subject to any disclaimer, the term of this patent is extended or adjusted under 35 U.S.C. 154(b) by 1521 days.

(21) Appl. No.: 13/585,324

(22) Filed: Aug. 14, 2012

(65) Prior Publication Data

US 2013/0086232 A1 Apr. 4, 2013

(30) Foreign Application Priority Data

Sep. 30, 2011 (KR) .................. 10-2011-0100121

(51) Int. Cl.
G06F 15/177 (2006.01)
H04L 29/06 (2006.01)
H04L 12/28 (2006.01)

(52) U.S. Cl.
CPC ...... *H04L 65/1073* (2013.01); *H04L 12/2809* (2013.01)

(58) Field of Classification Search
CPC .................................. H04L 65/1073
USPC .................................. 709/220, 221
See application file for complete search history.

(56) References Cited

U.S. PATENT DOCUMENTS

| 7,796,616 | B2 | 9/2010 | Kim | |
| 2003/0018710 | A1 | 1/2003 | Choi | |
| 2003/0169728 | A1* | 9/2003 | Choi | 370/352 |
| 2006/0274757 | A1 | 12/2006 | Kikkoji et al. | |
| 2007/0206745 | A1 | 9/2007 | Sakata | |
| 2008/0141347 | A1 | 6/2008 | Kostiainen et al. | |
| 2009/0086688 | A1 | 4/2009 | Kvache et al. | |
| 2009/0287802 | A1* | 11/2009 | Koistinen et al. | 709/221 |
| 2009/0306793 | A1 | 12/2009 | Takebayashi et al. | |
| 2012/0030773 | A1* | 2/2012 | Schwesig | 726/28 |

FOREIGN PATENT DOCUMENTS

| CN | 1381969 | 11/2002 |
| CN | 1853190 | 10/2006 |
| EP | 2 129 054 | 12/2009 |
| JP | 2003-345687 | 12/2003 |
| JP | 2004-007671 | 1/2004 |
| KR | 1020070063178 | 6/2007 |

OTHER PUBLICATIONS

Bill Russell et al., "Remote Access Architecture: 2 for UPnP Version 1.0", XP055018796, Apr. 30, 2011.
European Search Report dated Jun. 15, 2015 issued in counterpart application No. 12834934.7-1853, 8 pages.
Chinese Office Action dated Sep. 6, 2016 issued in counterpart application No. 201280048325.6, 18 pages.

* cited by examiner

*Primary Examiner* — Hee Soo Kim
(74) *Attorney, Agent, or Firm* — The Farrell Law Firm, P.C.

(57) ABSTRACT

A method for registering a device in a server is provided. The method includes connecting a first device positioned in a certain area to a server; and registering a second device by transmitting identification information of the second device positioned in the certain area to the server by the first device, and storing the identification information of the second device in the server.

20 Claims, 23 Drawing Sheets

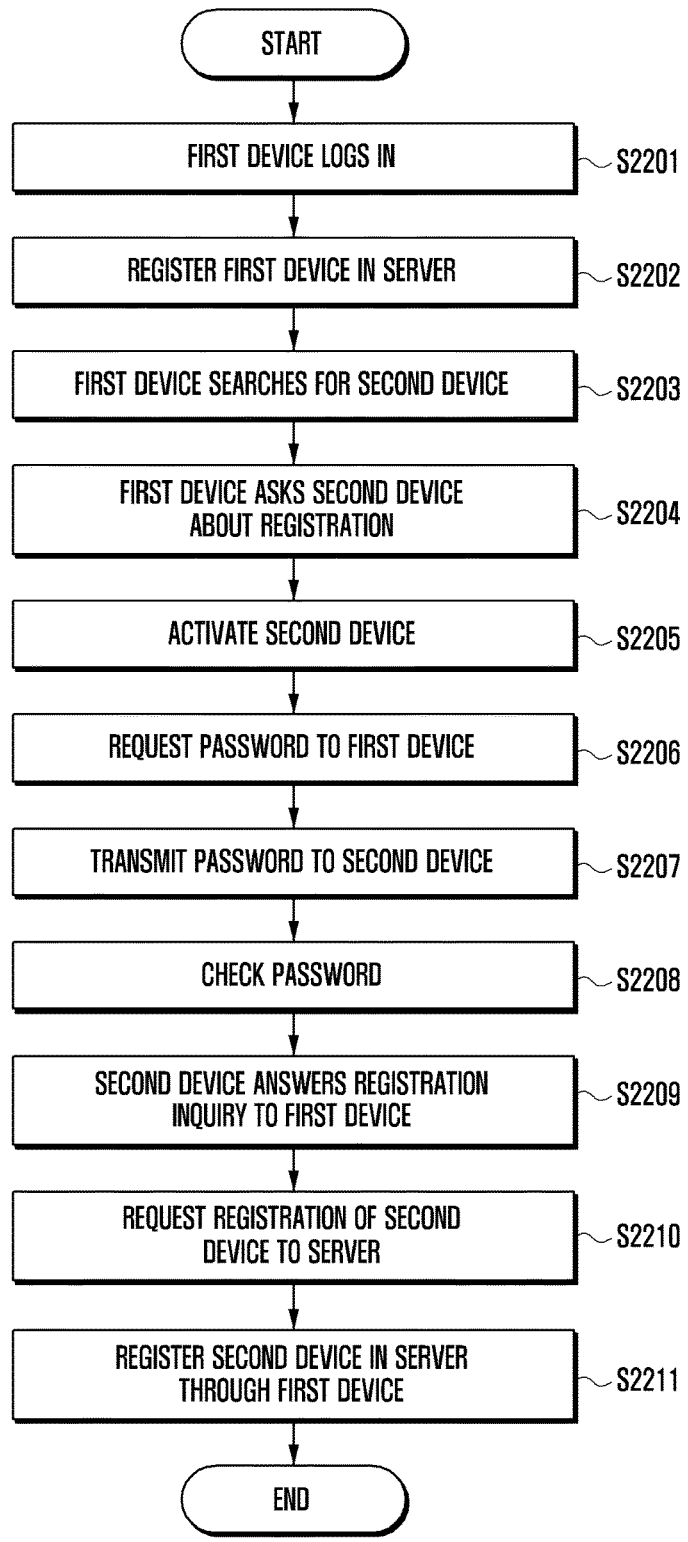

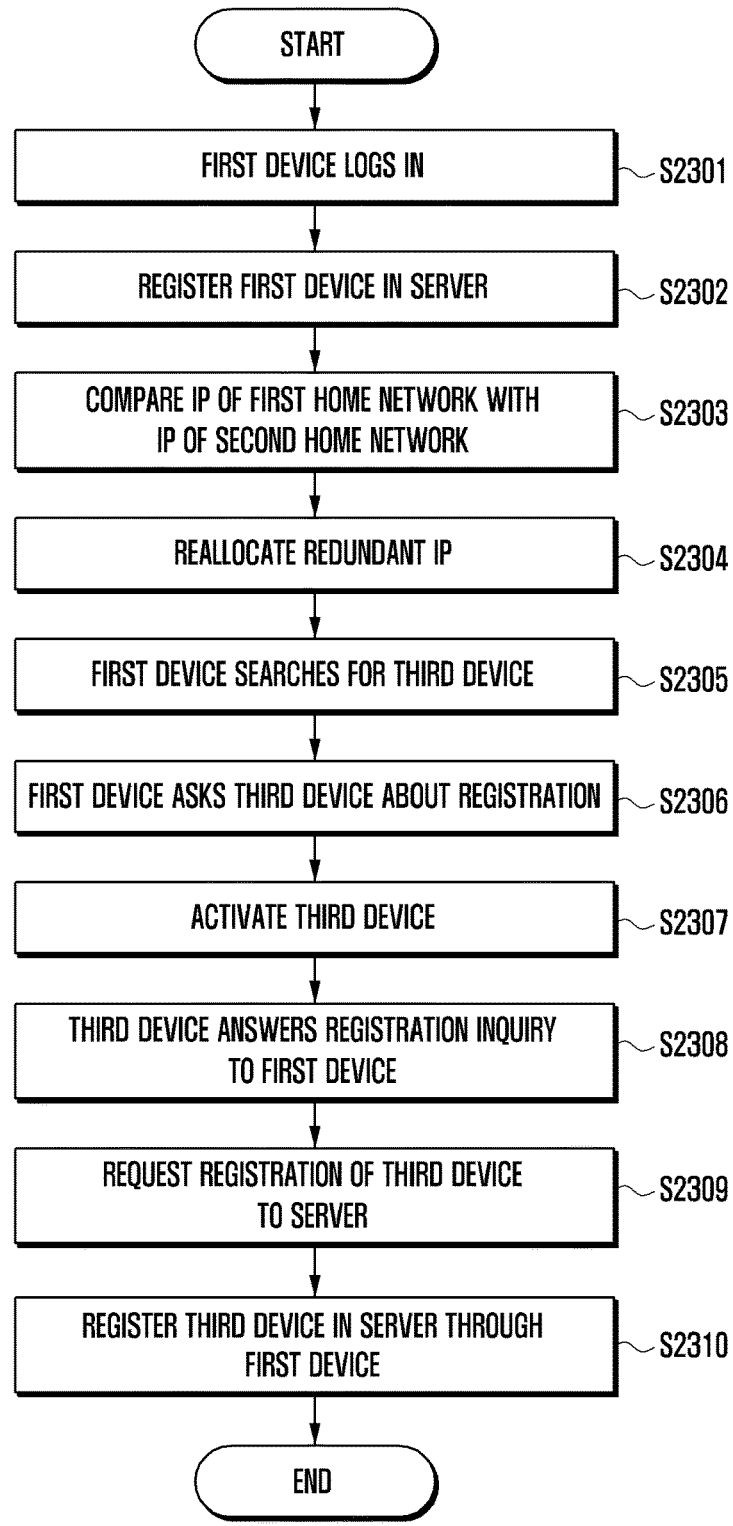

METHODS AND APPARATUS FOR REGISTERING A DEVICE TO SERVER

PRIORITY

This application claims priority under 35 U.S.C. § 119(a) to Korean Patent Application No. 10-2011-0100121, which was filed in the Korean Intellectual Property Office on Sep. 30, 2011, the entire disclosure of which is incorporated herein by reference.

BACKGROUND OF THE INVENTION

1. Field of the Invention

The present invention relates generally to a method and apparatus for registering a device in a server, and more particularly, to a method and apparatus for registering devices positioned in the same network in a server.

2. Description of the Related Art

Various devices are currently being used in the home, which include, for example, an information device such as a Personal Computer (PC), a communication device such as a phone, a broadcast device such as a Television (TV), and Audio and Video (AV) devices such as a Digital Video Disc (DVD) player and a digital camera. Home automation for automatically controlling these devices has already entered the marketplace.

Home automation first separately controlled the devices using a phone or infrared rays. Specifically, early home automation did not involve a connection between the individual devices. However, through the development of communication technologies, a method of establishing a network between home appliances, which utilizes a controller for controlling the network, is has been used for integral management.

A system for integrally managing home appliances by establishing a network for the appliances is referred to as a "home network system". The home network system connects various network home appliances (e.g., a TV, a washing machine, a microwave oven, a gas range, an audio player, an air conditioner, and a boiler, etc.), lighting, a gas valve, and a front door, etc. to a controller such as a home gateway and a home server, and controls the connected devices through a certain terminal (e.g., a remote controller).

Various devices are being introduced that have applied technologies for efficiently implementing data sharing between devices, which is required in providing a home network service or an integrated service of communication and broadcasting.

The Digital Living Network Alliance (DLNA) is an official partner for home network commercialization, and is a new name of Digital Home Working Group (DHWG), which was launched in June, 2003.

The goal of the DLNA is to establish a mutually compatible platform based on the already established and publicized industry standards and to realize convergence between industries. The DLNA is promoting the introduction of guidelines for companies based on the Universal Plug and Play (UPnP), which is widely used in companies that manufacture home appliances, personal computers, and wireless devices, etc.

The UPnP is a technology that allows communication between home devices connected to the network without a complicated setting procedure, and allows a device to automatically find a service held by another device.

Further, the guidelines, which are currently being introduced in the DLNA, provides a design principal allowing contents to be shared between different brands and products through the wired/wireless home network between home appliances, personal computers and wireless devices. Hence, the products, which are designed according to the guidelines, can share media contents such as music, pictures and video files, through the home network.

When sharing contents between devices in the DLNA-based home network environment, the home network data sharing system controls services in consideration of the characteristics of the devices and the communication environment. The home network data sharing system also allows interworking with various servers in the communication network in order to provide better quality services. When registration to the service is necessary for interworking with a server, registration is performed for each device.

SUMMARY OF THE INVENTION

The present invention has been made to address at least the above problems and/or disadvantages and to provide at least the advantages described below. Accordingly, an aspect of the present invention provides a technology for registering a device in a server through one of a plurality of devices in a home network.

Another aspect of the present invention provides a technology for registering another device in another home network in a server through a device in a home network, in another home network that is different from a home network positioned in the same server.

In accordance with an aspect of the present invention, a method is provided for registering a device in a server. A first device is connected to the server. A second device is registered with the server by transmitting identification information of the second device from the first device to the server, and storing the identification information of the second device in the server. The first device and the second device are disposed within at least one network connected to the server.

In accordance with another aspect of the present invention, a method is provided for registering a device in a server. Identification information of a second device is received at the server from a first device. The second device is registered with the server by storing the received identification information of the second device. The first device and the second device are disposed within at least one network connected to the server.

In accordance with an additional aspect of the present invention, a device is provided that includes a communication unit. The device also includes a controller that connects the communication unit to a server, and transmits identification information of another device to the server through the communication unit so that the other device is registered in the server. The first device and the second device are disposed within at least one network connected to the server.

In accordance with a further aspect of the present invention, a server is provided for registering a device. The server includes a storage unit and a communication unit that communicates with a first device. The server also includes a controller that receives identification information of a second device from the first device, stores the received identification information in the storage unit, and registers the second device with the server. The first device and the second device are disposed within at least one network connected to the server.

In accordance with another aspect of the present invention, a system is provided for registering a device. The system includes a first device, and a second device in communication with the first device. The system also includes a server that receives identification information of the second device from the first device, stores the received identification information, and controls registration of the second device. The first device and the second device are disposed within at least one network connected to the server.

BRIEF DESCRIPTION OF THE DRAWINGS

The above and other aspects, features and advantages of the present invention will be more apparent from the following detailed description when taken in conjunction with the accompanying drawings, in which:

FIG. 22 is a flowchart illustrating a process in which a second device requests a password from a first device when the first device connects to the second device, according to an embodiment of the present invention; and FIG. 23 is a flowchart illustrating a process in which another device in another home network is registered in a server using one of the devices in different home networks, according to an embodiment of the present invention.

DETAILED DESCRIPTION OF EMBODIMENTS OF THE PRESENT INVENTION

Embodiments of the present invention are described in detail with reference to the accompanying drawings. The same or similar reference numbers may be used throughout the drawings to refer to the same or like components. Detailed descriptions of constructions or processes well known in the art may be omitted to avoid obscuring the subject matter of the present invention.

According to an embodiment of the present invention, in a certain network environment where various electronic devices are connected to one device management unit based on an Internet Protocol (IP), the control of a plurality of electronic devices can be supported. In an embodiment of the present invention, the certain network environment can be represented as a network environment where a plurality of electronic devices are constituted within a certain area, such as, for example, a house, an office, a hospital, or a factory.

In embodiments of the present invention, the certain area can represent a home network, an in-house network, an in-building network, a network connecting buildings, or a plurality of home networks that are connected to the same server.

Figure 1:
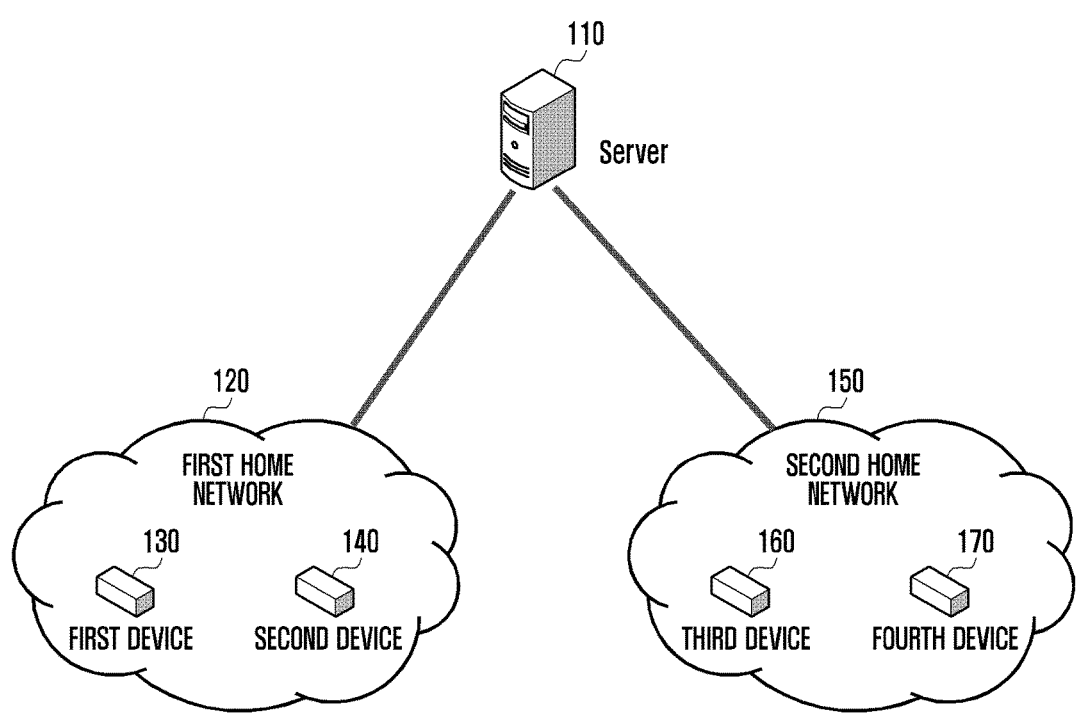
FIG. 1 is a diagram illustrating the connection of a plurality of home networks to a server, according to an embodiment of the present invention.

FIG. 1 is a diagram illustrating the connection of a plurality of home networks to a server, according to an embodiment of the present invention.

FIG. 1 is a diagram representing an entire system in which a device is registered in a server. The system includes a server 110, a first home network 120, and a second home network 150.

The server 110 is connected to the first home network 120 and the second home network 150, and each home network 120 and 150 includes different devices.

Because the server 110 is connected to the home networks 120 and 150, the server 110 can allow each of the devices to be connected to the server 110.

A first device 130 or a second device 140, which are different from each other, can be connected to the first home network 120. A third device 130 or a fourth device 170, which are different from each other and the devices connected to the first home network 120, can be connected to the second home network 150.

The UPnP can be used for communication between the first device 130 and the second device 140 in the first home network 120, and the UPnP can be used for communication between the third device 160 and the fourth device 170 in the second home network 150.

Further, the UPnP can be used for communication between the first home network 120 and the second home network 150.

Figure 2:
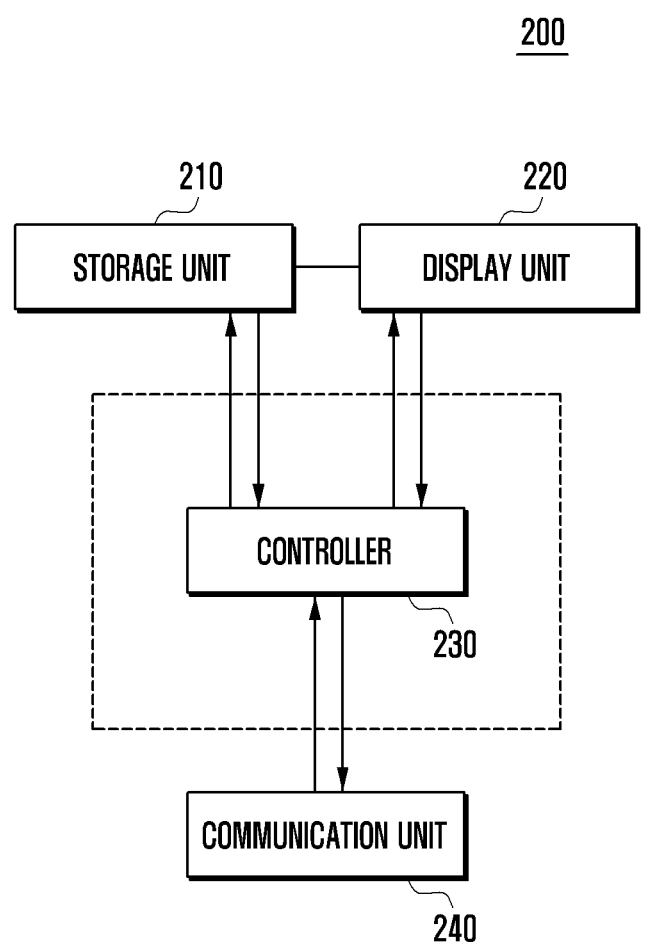
FIG. 2 is a circuit diagram illustrating a device, according to an embodiment of the present invention.

FIG. 2 illustrates a circuit diagram of a device, according to an embodiment of the present invention.

Referring to FIG. 2, a device 200 includes a storage unit 210, a display unit 220, a controller 230 and a communication unit 240.

The storage unit 210 stores a password, an ID, or identification information of the device 200. The identification information includes information that can identify the device 200, such as a unique number, a product name and a serial number, etc.

The display unit 220 displays an interface screen between the device 200 and the server (e.g., the server 110 of FIG. 1).

The controller 230 can control the device 200 to be registered in the server. Further, the controller 230 can control another device to be registered in the server through the device 200.

Further, the controller 230 controls the connection between devices in the home network based on the UPnP. The communication unit 240 connects the device 200 to another device, the home network or the server.

Figure 3:
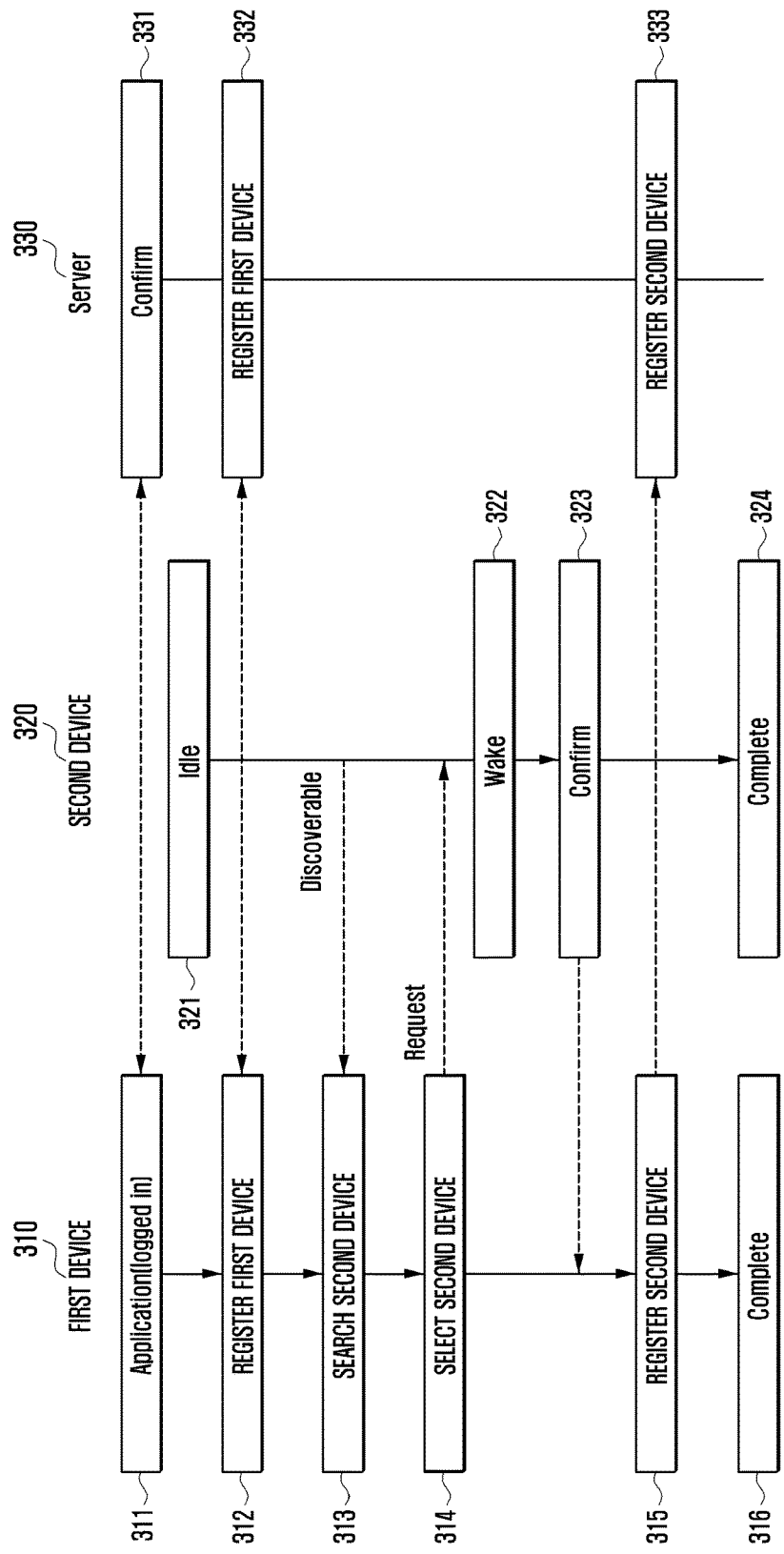
FIG. 3 is a procedural diagram illustrating a process of registering another device in a server using one of devices in a home network, according to an embodiment of the present invention.

FIG. 3 is a procedural diagram illustrating a process of registering another device in a server using one of the devices in a home network, according to an embodiment of the present invention.

Referring to FIG. 3, a first device 310 executes an application for connecting to a server 330, and a user inputs an Identifier (ID) and a password, step 311. In accordance with another embodiment of the present invention, the ID and the password can be stored in advance and can be sent to the server by the executed application.

The server 330 checks the inputted ID and password, and if the inputted ID and password coincide with the registered ID and password, an approval message is sent to the first device 310 so that the first device 310 can communicate with the server 330, in step 331.

The first device 310 requests registration by sending identification information of the first device 310 through the controller 230, in step 312.

The identification information of the first device can be stored in the storage unit 210.

The server 330 receives identification information of the first device, and allows registration of the first device 310. Further, the server 330 sends a confirmation signal of the first registration to the first device 310, in step 332.

After the first device 310 is registered in the server 330, the first device 310 finds a second device 320 that exists in the home network through the communication unit 240, in step 313.

Specifically, in step 321, the second device 320 repeatedly transmits a message, which indicates the state of the second device 320, to the first device 310 at regular time intervals in the home network while in an idle mode, which is an unused state.

The first device 310 communicates with the second device 320 in the home network using the received message, in step 313.

When the second device 320 sends the message to the first device 310, the second device 320 can be in the idle mode or in a wake-up mode, which is an in-use state.

The first device 310 receives the message through the controller 230, and asks the second device 320 if it has been registered in the server 330, in step 314.

When the second device 320 is in the idle mode and the second device 320 receives the inquiry about registration from the first device 310, the second device 320 is converted into the activated state, in step 322, so that it can communicate with the first device.

The activated second device 320 transmits a message to the first device 310 for server registration, in step 323.

The message can include the identification information of the second device 320.

The first device 310 sends a request for registration of the second device 320 to the server 330 based on the message received from the second device 320, in step 315.

The server 330 checks the received registration request, and registers the second device 320, in step 333.

If the registration of the second device 320 is completed in the server 330, the first device 310 completes the process of registering the second device in the server 330, in step 316, and the second device completes the process of being registered in the server 330 through the first device 310, in step 324.

The server 330 can include a storage unit where the identification information of the first device 310 and the identification information of the second device 320 are stored, a communication unit that communicates with the first device 310, and a controller that controls registration of the second device 320 based on the identification information of the second device 320 that is provided through the first device 310.

In FIG. 3, unlike server registration through each device, a device can be registered in the server 330 through another device among a plurality of devices in the home network.

For example, when a user has a plurality of devices, only one device among the plurality of devices is registered in the server, and only one account is formed in the server, the user can register other devices through the established account.

The account can include device information and user information of the device.

The account can also include a plurality of devices because device information and user information of the other device can be added.

In order for the device to connect to the server, an ID and a password can be inputted to the account of the device.

FIGS. 4 to 10 relate to the embodiment of the present invention described with respect to FIG. 3.

Figure 4:
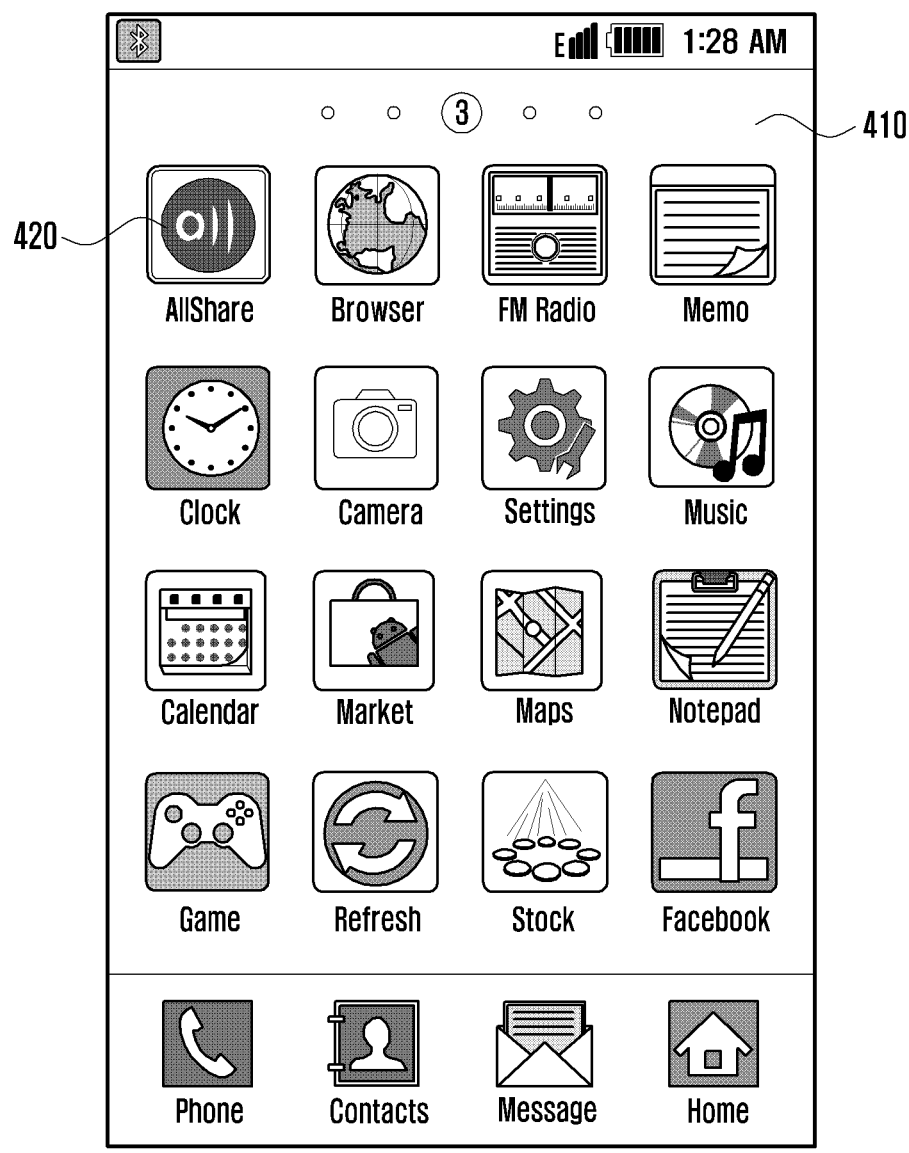
FIG. 4 illustrates icons for executing applications in a display, according to an embodiment of the present invention.

FIG. 4 illustrates icons for executing applications in a display, according to an embodiment of the present invention.

Referring to FIG. 4, an icon 420, which searches for the second device 320, is displayed in a display 410 of the first device 310.

If the icon 420 is selected, a convergence application, which searches for the second device 320 in the home network, is executed.

Figure 5:
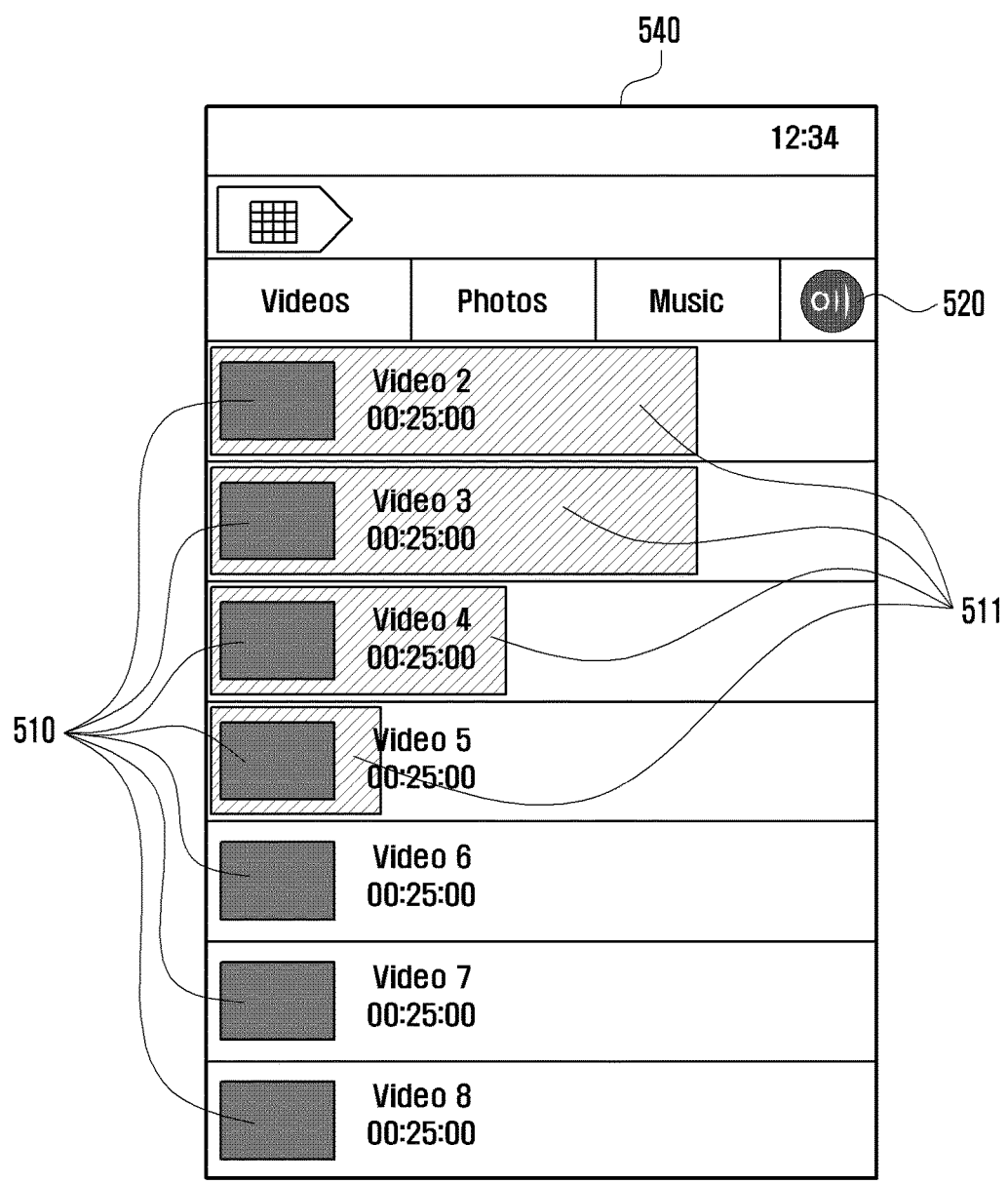
FIG. 5 illustrates contents in a first device and device management menu icons in a display of a display unit, according to an embodiment of the present invention.

FIG. 5 illustrates contents in a first device and device management menu icons in a display of a display unit, according to an embodiment of the present invention.

If the convergence application is executed and the first device 310 is already registered in the server, the convergence application transmits the ID and password, the device is logged in at the server, and contents 510 of the device are displayed in a display 540 through the display unit 220.

When the first device 310 is not registered in the server and the icon 420 in the display 540 of the first device 310 is selected, the ID and password for connection to the server are displayed in the display 540.

If the ID and password are inputted in the display 540, the display unit 220 and the controller 230 transmit the ID and password obtained through the display unit 220 to the server.

The server checks the received ID and password and allows the connection of the first device 310.

The connection indicates that the first device 310 connects to the server.

A rectangular bar 511 shown in the display 540 indicates an amount of each of the contents that has been executed.

For example, if the rectangular bar 511 is long, all of the contents have been executed, and if the rectangular bar 511 is short, only part of the contents have been executed. For example, when the contents are a one-hour movie, a user may watch only part of the movie. If the movie has been played for 30 minutes, the rectangular bar 511 reaches the middle.

In contrast, if the user finished watching the movie, the rectangular bar 511 reaches the end of the right edge.

If a registration icon 520 in the display is selected, the device management menu is executed.

The device management menu is an application that searches for devices in the home network.

Figure 6:
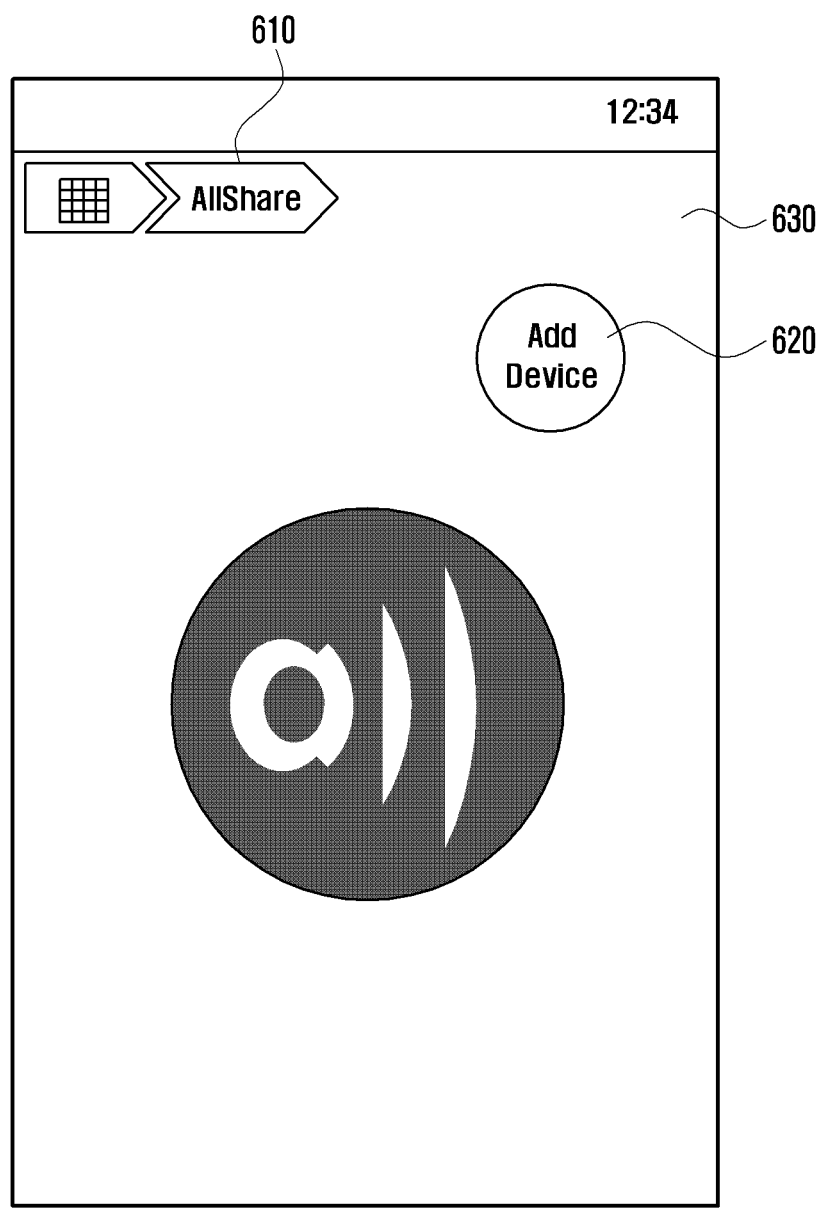
FIG. 6 illustrates a display when a device in a home network can be found, according to an embodiment of the present invention.

FIG. 6 illustrates a display in which a device in a home network can be found, according to an embodiment of the present invention.

In FIG. 6, if the registration icon 520 is selected, the screen of FIG. 5 is converted into a screen that searches for another device in the home network through the device.

An arrow bar 610 indicates that a display 630 is the device management menu.

The display 630 of FIG. 6 can include the arrow bar 610 indicating the state of the display 630, and a search icon 620 that executes an application that searches for devices in the home network.

If the search icon 620 in the display 630 is selected, an application that searches for another device in the home network through a device, can be executed.

The display unit 220, which controls the display 630, controls the arrow bar 610 or the search icon 620 displayed in the display 630.

Figure 7:
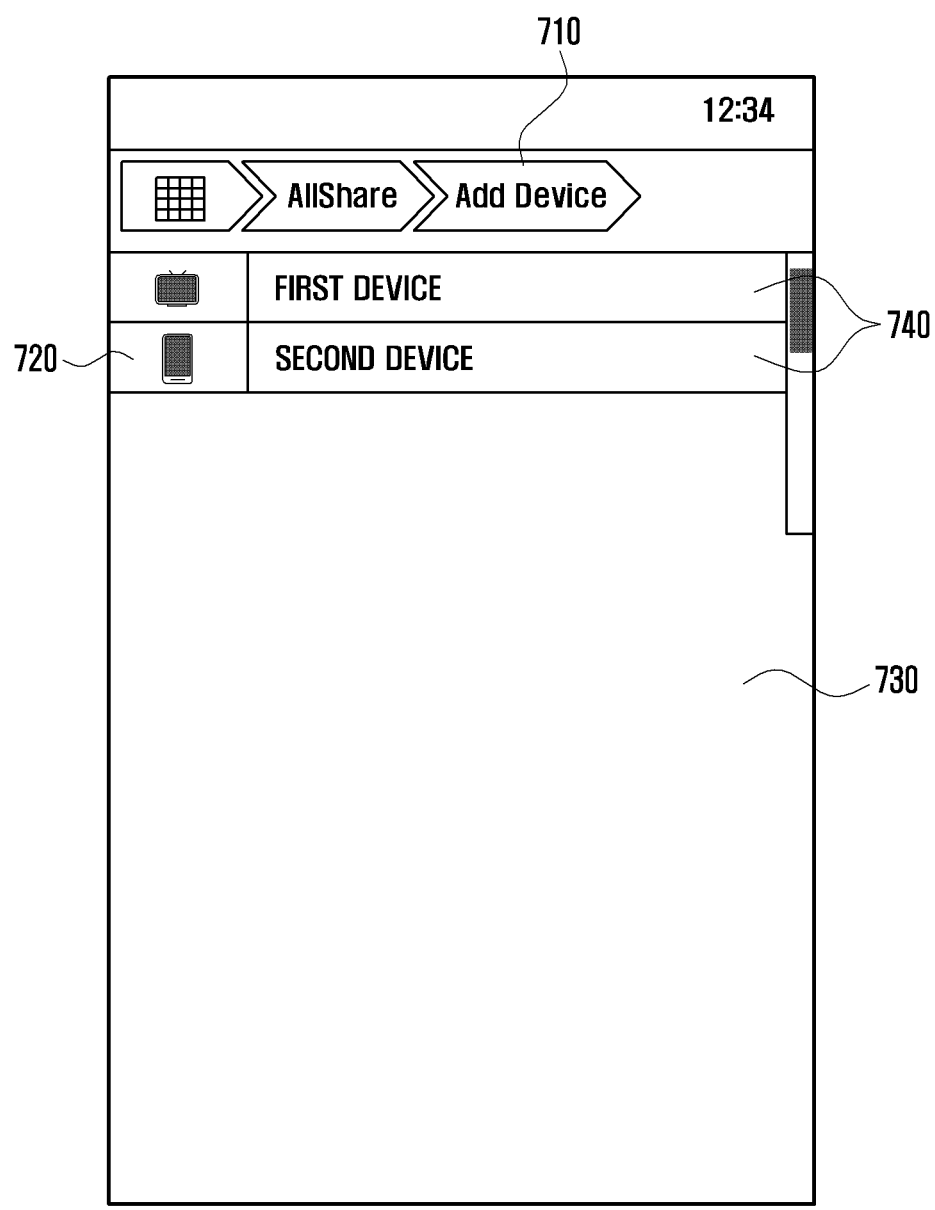
FIG. 7 illustrates a list of devices in a home network, according to an embodiment of the present invention.

FIG. 7 illustrates a list of devices in a home network shown in the display when a search icon is selected, according to an embodiment of the present invention.

The controller 230 is positioned in the first device 310, and the first device 310 and the second device exist in the same home network.

Hence, when a second device 720 is selected from a list 740 of a plurality of devices, the controller 230 can control the first device to communicate with the second device 720.

Figure 8:
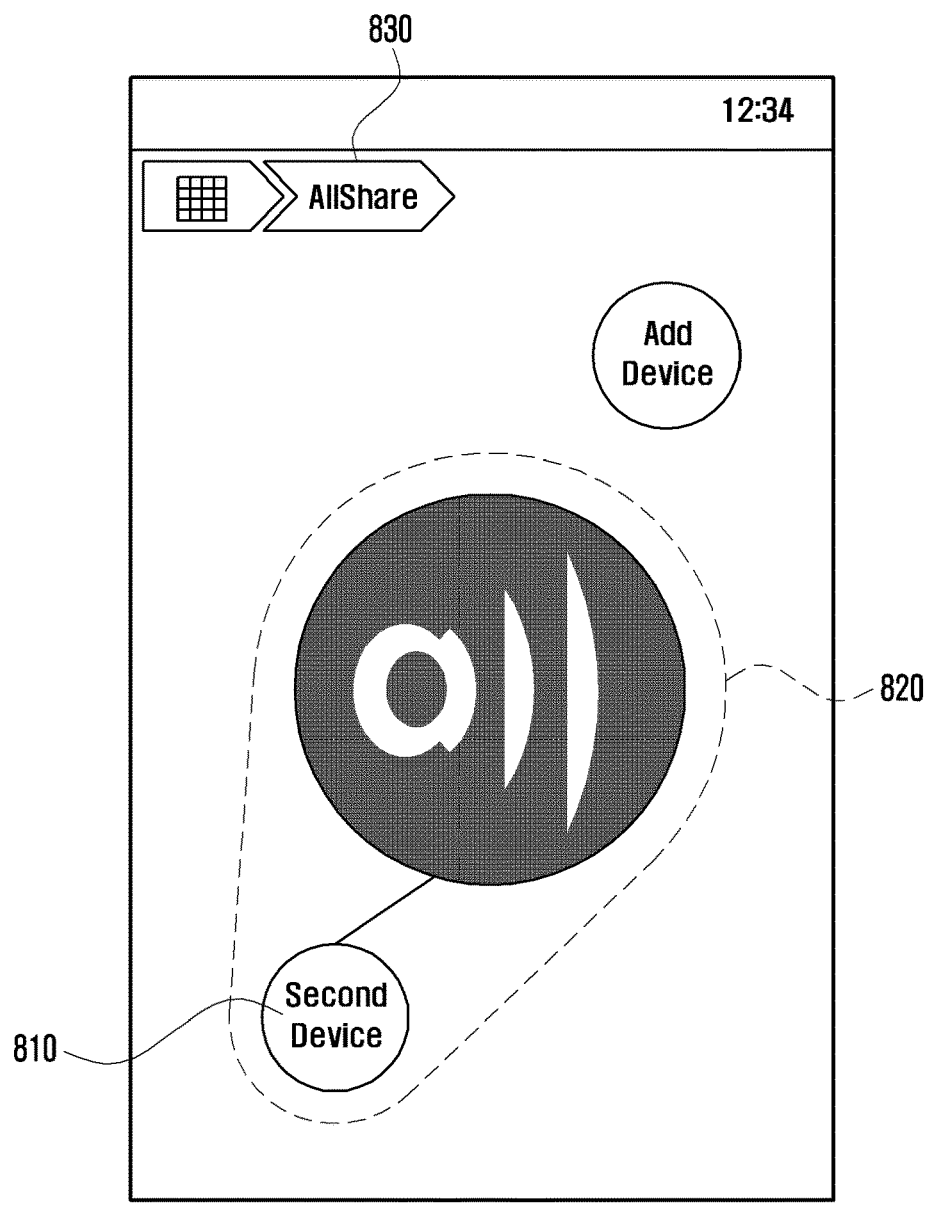
FIG. 8 illustrates a state in which a selected device is registered in a server, according to an embodiment of the present invention.

FIG. 8 illustrates the state where the selected device is registered in a server, according to an embodiment of the present invention.

Registration of the selected device 720 in the server is described in detail below. The selected device 702 represents the second device 810 and 320.

The first device requests a message, which is necessary in registering with the server, to the second device 810, and the second device 810 checks the request of the first device 310 and transmits the requested message to the first device 310.

The message can represent the identification information of the second device 810.

The first device 310 sends a request for registration of the second device 810 to the server based on the received message of the second device 810.

The server checks the registration request received from the first device, and allows registration of the second device 810.

An arrow bar 830 indicates that the second device 810 is in a registered state 820 with the server.

Figure 9:
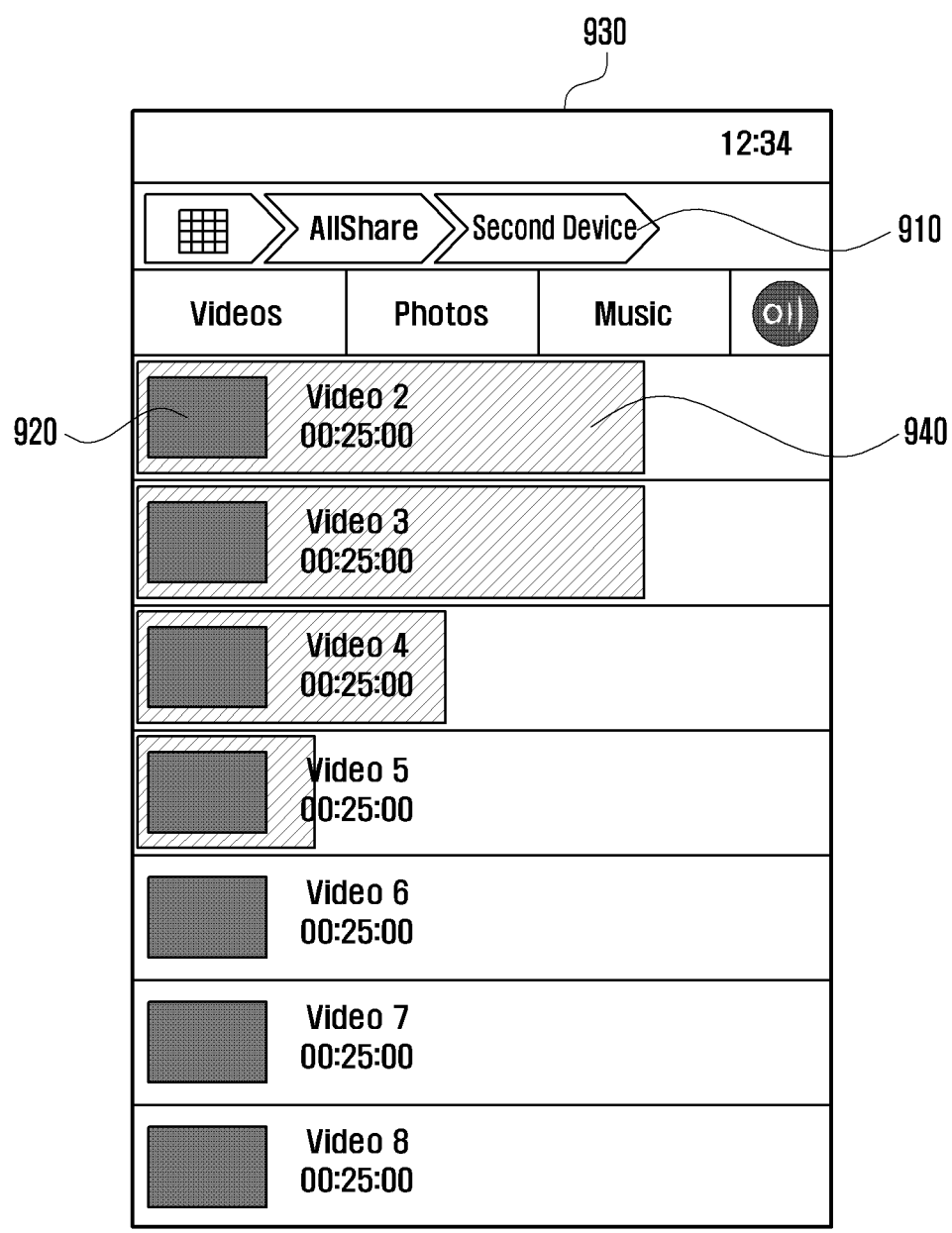
FIG. 9 illustrates a state of an additionally registered device and a contents list of the registered device, according to an embodiment of the present invention.

FIG. 9 illustrates a state of an additionally registered device and a contents list of the registered device, according to an embodiment of the present invention.

If the second device 810 is selected, the contents in the second device 810 can be shown as illustrated in FIG. 9.

An arrow bar 910 indicates that contents 920 shown in a display 930 are the contents 920 in the second device 810.

A rectangular bar 940 indicates the amount of the contents 920 that have been executed.

Specifically, if all of the contents 920 are executed, the rectangular bar 940 is lengthened to the right edge of the display 930.

As another example, if half of the contents are executed, the rectangular bar 940 is lengthened to the middle of the display 930.

Therefore, the amount of contents 920 executed can be known through the length of the rectangular bar 940.

Figure 10:
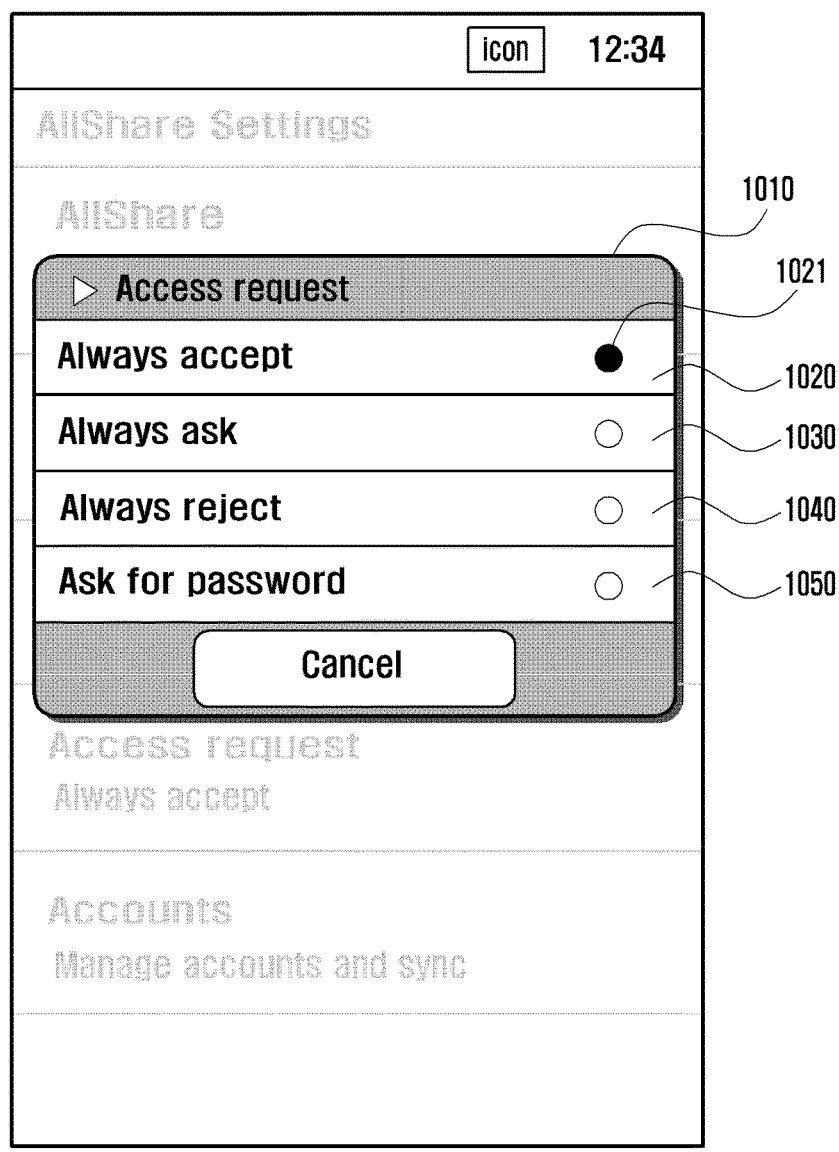
FIG. 10 illustrates correspondence in a first device according to a response that is set in a second device when registering the second device in a server, according to an embodiment of the present invention.

FIG. 10 illustrates correspondence in a first device according to a response that is set in a second device when registering the second device in a server, according to an embodiment of the present invention.

Referring to FIG. 10, the first device finds the second device in the home network and attempts to communicate with the second device, and requests registration of the second device to the server as illustrated in FIG. 6.

When the first device connects to the second device, the setting for connection with the first device is shown in the screen of the second device.

When the second device is registered in the server through the first device, the connection of the first device and the second device can be differently constituted according to the response setting value of the second device.

The connection constitution of the second device can be represented by a setting change frame 1010.

The setting change frame 1010 represents various methods for connection of the first device when the first device connects to the second device.

There are change items 1020, 1030, 1040 and 1050 in the setting change frame 1010, and one of the change items 1020, 1030, 1040 and 1050 can be selected according to the condition.

Always Accept 1020 indicates that registration of the second device is always requested to the server. There is no need to ask whether the first device will request registration of the second device when the second device is registered in the server through the first device.

Always Ask 1030 indicates that the first device asks the second device whether to request registration with the server before the registration process of the second device to the server through the first device is started.

In Always Ask 1030, a pop-up window, in which the first device requests connection of the second device, can be shown in the display of the second device when the first device connects to the second device.

A phrase, which indicates allowance or rejection of the first device, can be inputted in the pop-up window shown in the second device.

The first device can obtain the device information of the second device, i.e., the identification information of the second device, by connecting to the second device. Further, the first device can request registration of the second device by sending the obtained identification information to the server.

Always Reject 1040 indicates that the second device does not allow communication of the first device when the second device is registered in the server through the first device.

When Always Reject 1040 is selected, the second device cannot be registered in the server using the first device.

In Ask for Password 1050, when the second device is registered in the server through the first device, the second device can ask the first device the password, receive and check the password inputted through the screen of the first device, and accept or reject connection of the first device.

In Ask for Password 1050, a pop-up window, where a password can be inputted, can be displayed in the display of the first device when the first device connects to the second device.

The password inputted in the pop-up window is compared with a preset password, and when the two passwords are the same, the second device allows connection of the first device.

In contrast, when the password inputted in the pop-up window is different from the preset password, the second device rejects connection of the first device.

The first device can connect to the second device, and obtain the device information of the second device, i.e., the identification information of the second device. Further, the first device can send the identification information to the server, and request registration of the second device.

Figure 11:
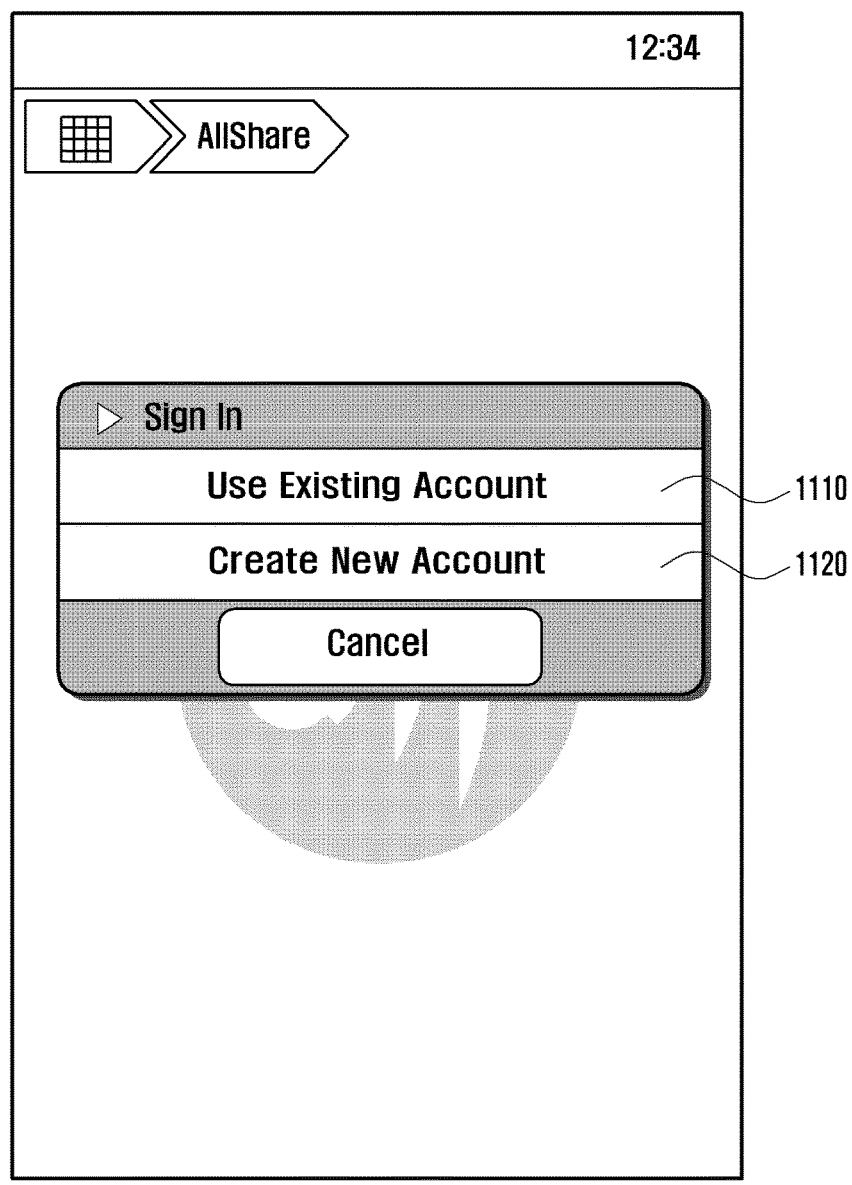
FIG. 11 illustrates the selection of the use of an already registered device account or the creation of a new account of the first device, according to an embodiment of the present invention.

FIG. 11 illustrates the selection of the use of an already registered device account or the creation of a new account of the first device, according to an embodiment of the present invention.

The display of FIG. 11 can be provided between the displays of FIGS. 4 and 5 or between the displays of FIGS. 5 and 6. The first device can connect to the server using an existing account 1110 of the first device that is already registered in the server, or can create a new account 1120 of the first device and connect to the server.

The existing account 1110 indicates that the first device is registered in the server.

The first device can connect to the server when the ID and password are inputted at the first device using the existing account 1110.

The server checks the received ID and password and allows for connection of the first device.

The new account 1120 indicates that the first device is not registered in the server.

The first device can request registration of the first device in the server by sending the identification information of the first device to the server.

If the server allows registration of the first device, the ID and password are inputted in the first device in order to make the account of the first device in the server.

The first device sends the inputted ID and password to the server so that the ID and password are stored in the server.

The ID and the password inputted in the display of the first device are controlled in the controller 230 and the display unit 220, and the ID and the password are stored in the storage unit 210.

When the first device connects to the server, the server asks the first device for the ID and password stored in the server.

The first device shows the received inquiry from the server in a pop-up window.

The ID and the password inputted in the pop-up window are sent to the server, and the server compares the ID and the password with the stored ID and the password.

When the ID and the password are the same as the stored ID and password, the server allows connection of the first device.

Figure 12:
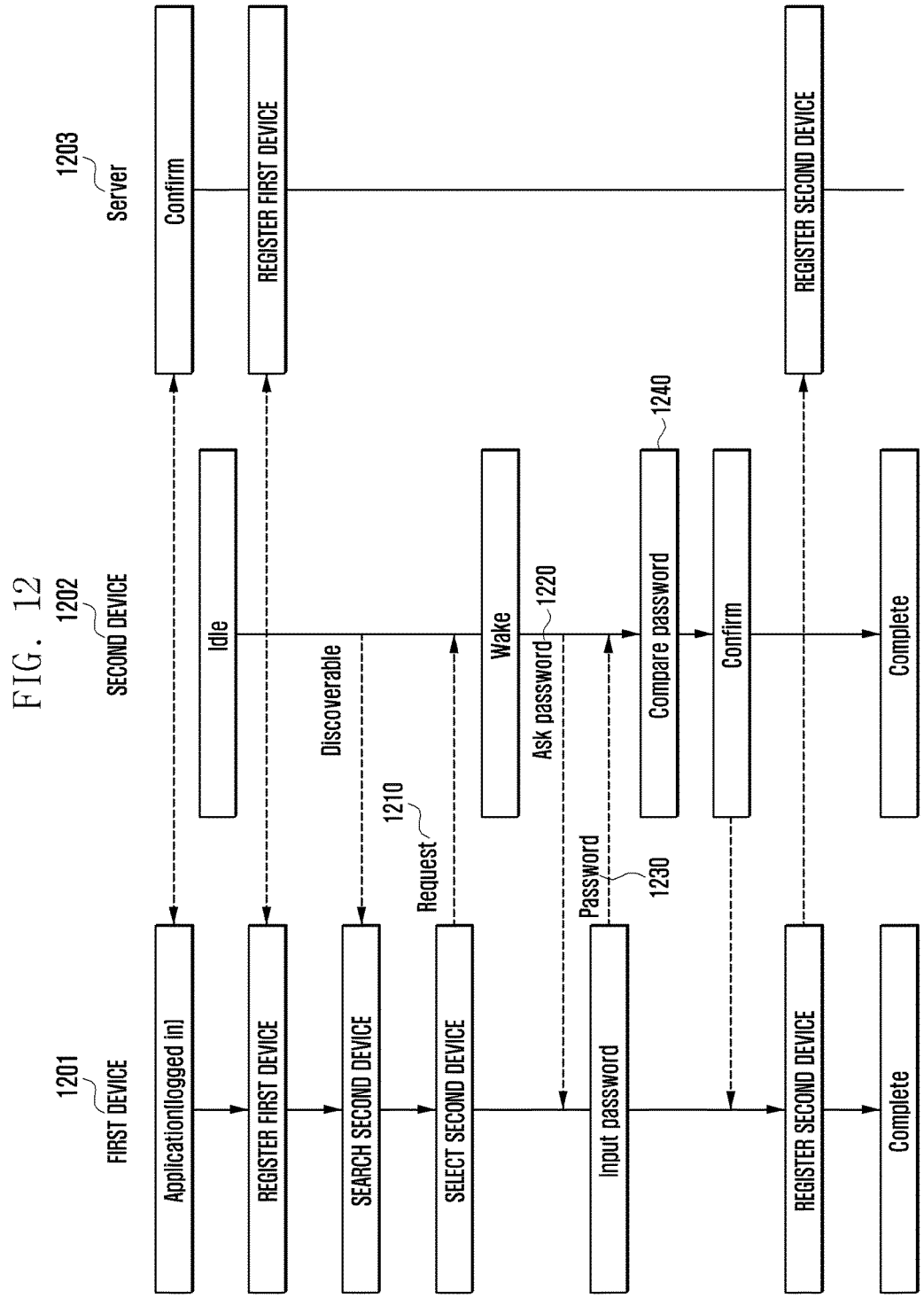
FIG. 12 is a procedural diagram illustrating a process in which a second device requests a password from a first device when the first device connects to the second device, according to an embodiment of the present invention.

FIG. 12 is a procedural diagram illustrating a process in which a second device requests a password from a first device when the first device connects to the second device, according to an embodiment of the present invention.

FIG. 12 illustrates a detailed procedural diagram for a password request 1050 of FIG. 10.

FIG. 12 provides steps that are similar to those of FIG. 3, and further includes requesting the password in step 1220, inputting the password in step 1230 and checking the password in step 1240.

A first device 1201 receives a message from a second device 1202, and asks the second device 1202 its state of registration in the server, in step 1210.

When the second device 1202 is in an idle state, the second device 1202 is converted into the activated state.

The activated second device 1202 sends a request for the password to the first device 1201, in step 1220.

The first device 1201, which has received the password request, displays a pop-up window, where the password can be inputted, in the display of the first device 1201.

The first device 1201 transmits the inputted password to the second device 1202, in step 1230, and the second device 1202 receives the transmitted password and examines whether the received password is the same as the password which has been already set, in step 1240.

The set password can be a password that has been already stored in the second device 1202.

When the received password coincides with the stored password, the second device 1202 transmits the message of the second device 1202, which is necessary in registering with the server 1203, to the first device 1201.

The message can be the identification information of the second device 1202.

The first device 1201 sends a request for registration of the second device 1202 to the server 1303 using the received message of the second device 1202.

The server 1303 receives the registration request of the second device 1202 from the first device 1201, and allows registration of the second device 1202 by checking the message of the second device 1202 received from the first device 1201.

Figure 13:
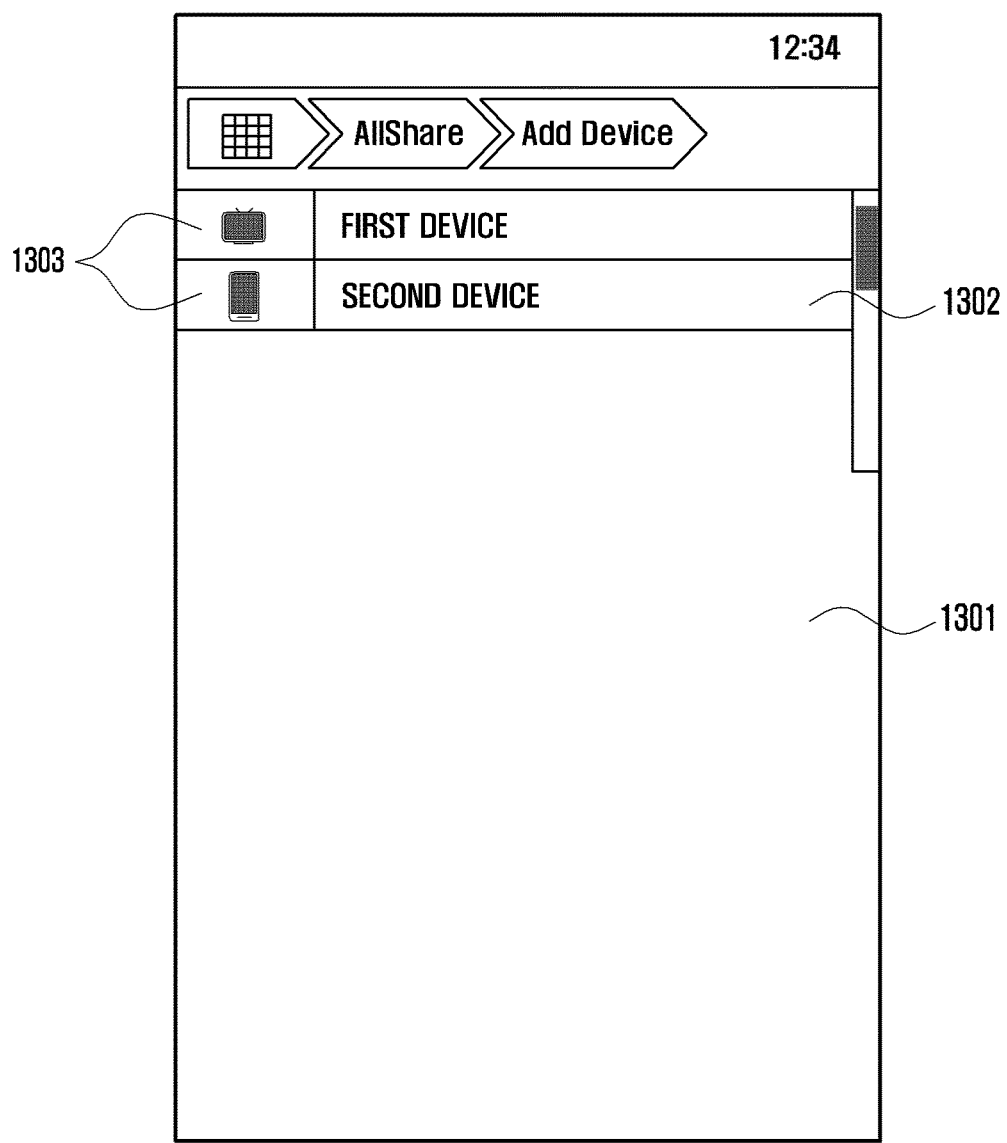
FIG. 13 illustrates a list of the second device in the display of the first device, according to an embodiment of the present invention.
Figure 14:
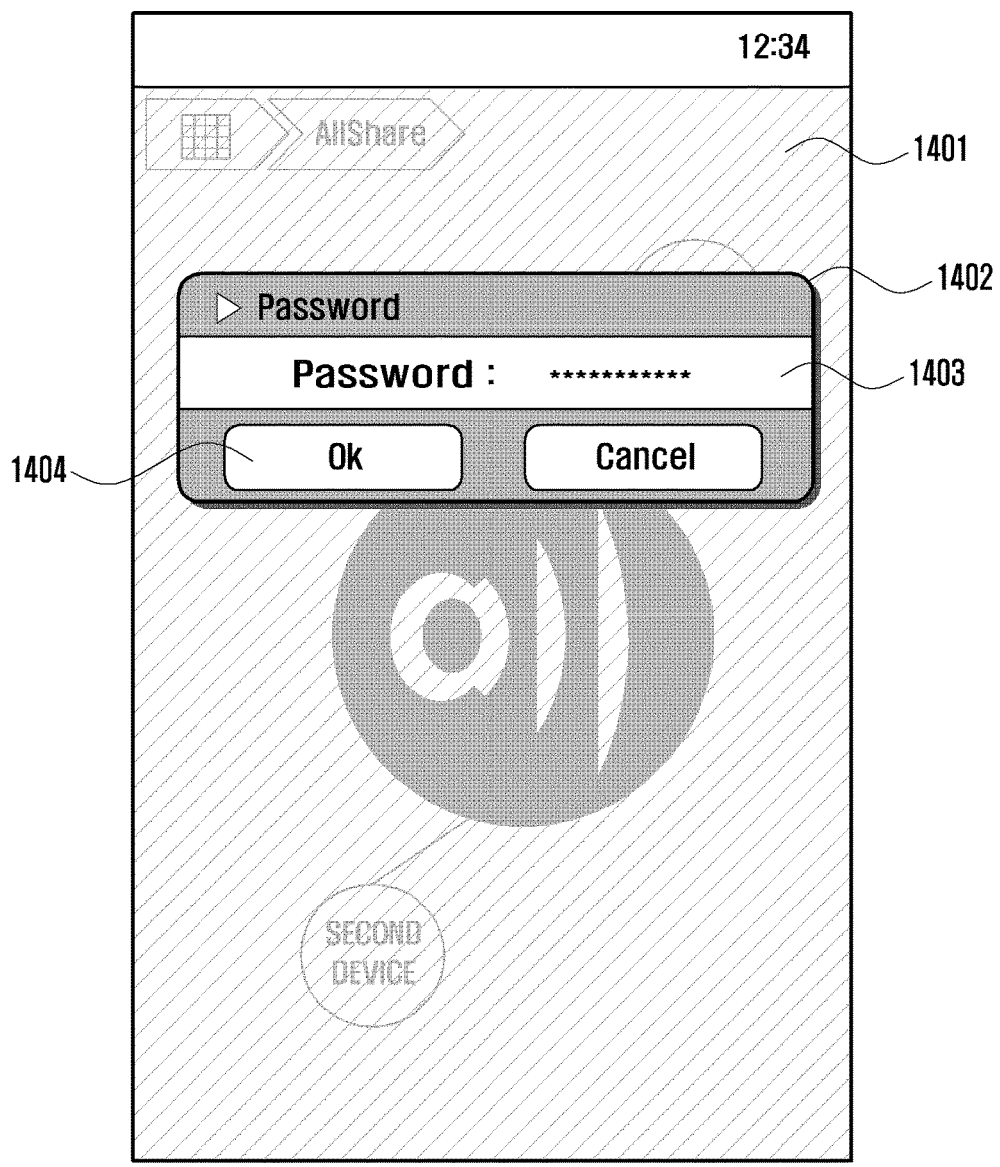
FIG. 14 illustrates a password input window in a display of a first device, according to an embodiment of the present invention.
Figure 15:
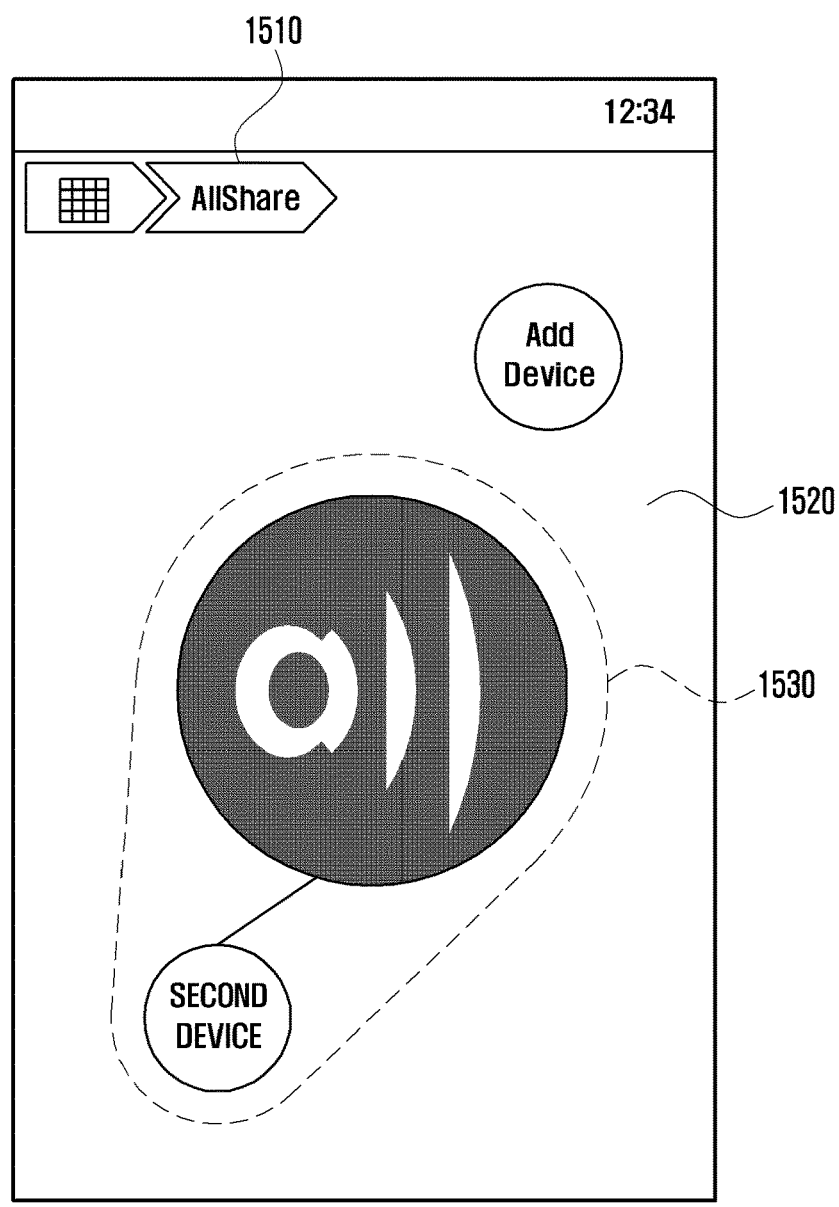
FIG. 15 illustrates a state in which a second device is registered in a server through a first device, according to an embodiment of the present invention.

FIGS. 13 to 15 relate to the embodiment of the present invention described with respect to FIG. 12.

FIG. 13 illustrates a list in the display of the first device, according to an embodiment of the present invention.

FIG. 13 shows a list 1303 of devices in the home network in a display 1301 of the first device that is provided when the search icon 620 is selected.

If a second device 1302 is selected from the list 1303 of devices shown in the first device 1201, the first device 1201 registers the second device 1302 with the server.

FIG. 14 illustrates a password input window in a display of a first device, according to an embodiment of the present invention.

When the first device 1201 connects to the second device 1202, the second device 1202 can send a request for the password to the first device 1201 in order to restrict connection of the first device 1201, in step 1050.

If the second device 1202 requests the password, a password input window 1402 is displayed on display 1401 of the first device 1201.

If a password 1403 is inputted into the password input window 1402 and a confirmation icon 1404 is selected, the display unit 220 transmits the inputted password to the controller 230.

When the password is compared with the preset password and the password is the same as the preset password, the controller 230 controls the first device 1201 to connect to the second device 1202.

FIG. 15 illustrates a state in which a first device registers a second device in a server, according to an embodiment of the present invention.

When the password received from the first device 1201 is compared with the preset password and the two passwords are the same, the second device 1202 transmits a message allowing for connection to the first device 1201.

If the first device 1201 receives the allowance message from the second device 1202, the first device 1201 sends a request for identification information to the second device 1202.

The second device 1202 checks the request of the first device 1201, and transmits the identification information of the second device to the first device 1201.

The first device 1201 obtains the identification information of the second device 1202, which is necessary for registration of the second device 120 with the server 1203.

The first device 1201 requests registration of the second device 1202 by transmitting the identification information of the second device 1202 to the server 1203.

The server 1203 checks an identification number of the second device 1202, and allows registration of the second device 1202.

An arrow bar 1510 indicates that the second device 1202 is in a registered state 1530 with the server in a display 1520 of the first device 1202.

Figure 16:
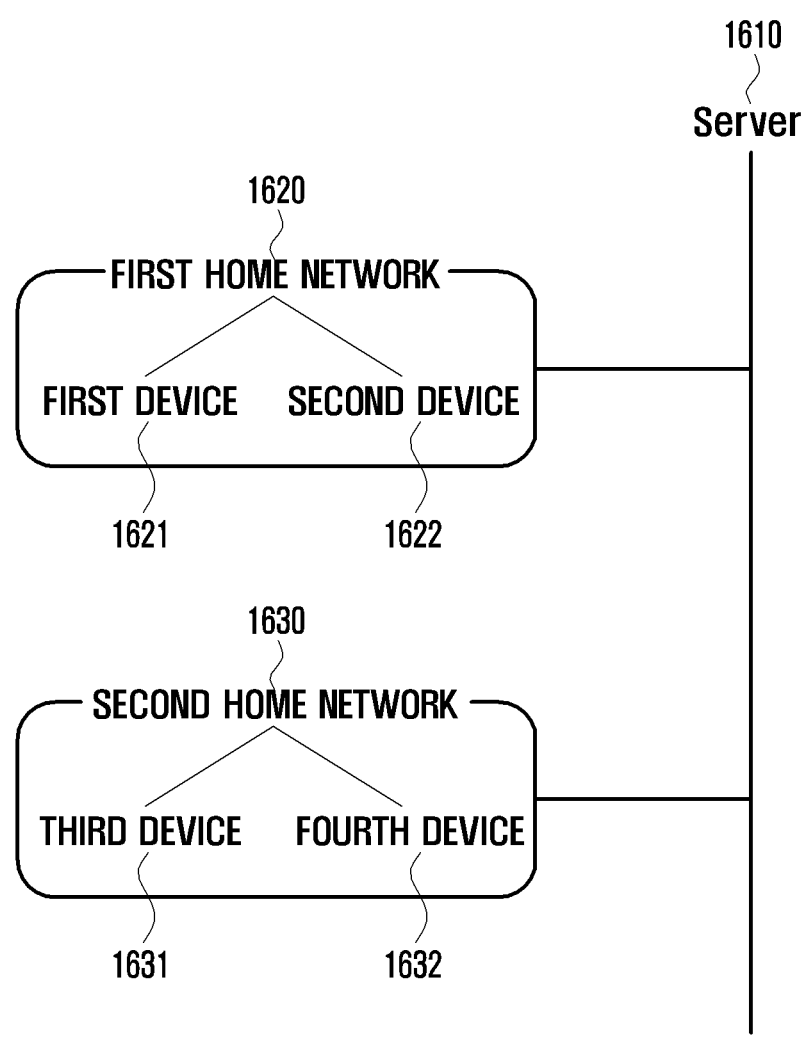
FIG. 16 illustrates the registering of a third device in another home network in a server through a first device, according to an embodiment of the present invention.

FIG. 16 illustrates the registering of a third device in another home network in a server through a first device, according to an embodiment of the present invention.

A server 1610 is connected to a first home network 1620 and a second home network 1630.

The first home network 1620 is connected to first and second devices 1621 and 1622, and the first and second devices 1621 and 1622 can communicate with each other using the UPnP.

Similarly, the second home network 1630 is connected to third and fourth devices 1631 and 1632, and the third and fourth devices 1631 and 1632 can communicate with each other using the UPnP.

Further, the first home network 1620 and the second home network 1630, which are connected to the same server 1610, can communicate with each other using the UPnP.

The first device 1621, which is connected to the first home network 1620, can find the third device 1631 in the second home network 1630 through the UPnP.

Because the first home network 1620 and the second home network 1630 are constituted independently, the Internet Protocols (IPs) allocated to the first and second devices 1621 and 1622 by the first home network 1620 and the IPs allocated to the third and fourth devices 1631 and 1632 by the second home network 1630 are the same, and thus, the IPs can collide.

When the same IP exists between the first home network 1620 and the second home network 1630, the devices having the same IP cannot communicate with each other.

In order to prevent collision between the IPs, the IPs of the first home network 1620 and the IPs of the second home network 1630 should be compared to check whether they have the same IP.

The first home network 1620 transmits the IPs of the first home network 1620 to the second home network 1630, and the second home network 1630 compares the transmitted IPs with the IPs of the second home network 1630.

Further, the first home network 1620 can ask the second home network 1630 the IPs of the second home network 1630, and obtain data of the IPs of the second home network 1630.

The first home network 1620 can check whether there is the same IP by comparing the obtained IPs of the second home network 1630 with the IPs of the first home network 1620.

When a same IP exists in the IPs of the first home network 1620 and the IPs of the second home network 1630, the address of the collided IP can be changed.

Specifically, the collided IPs among the IPs of the devices 1621, 1622, 1631 and 1632 is changed to another IP, and the device connected to the collided IP can be reallocated to another IP.

FIG. 16 illustrates an embodiment of the present invention, and the IPs, which are in use in the first home network 1620 and the second home network 1630, are compared with each other, and are changed to an address of the IP where a collision will not occur.

Further, the first home network 1620 and the second home network 1630 communicate with each other using the UPnP, and the first device 1621 can be connected to the third device 1631 in the second home network 1430.

The first device 1621 can ask the third device 1631 the identification information of the third device 1631, and can obtain the identification information.

The first device 1621 can transmit the identification information of the third device 1631 to the server 1610, and can request registration of the third device 1631 to the server 1610.

The server 1610 checks the registration request, and transmits a message, allowing registration of the third device 1631, to at least one of the first device 1621 and the third device 1631.

Referring to FIG. 16, when the first device 1621 in the first home network 1620 is registered in the server 1610, the account of the first device 1621 can be formed in the server 1610.

Further, the first device 1621 can register the third device 1631 in this account. Hence, the account can include a plurality of devices.

Figure 17:
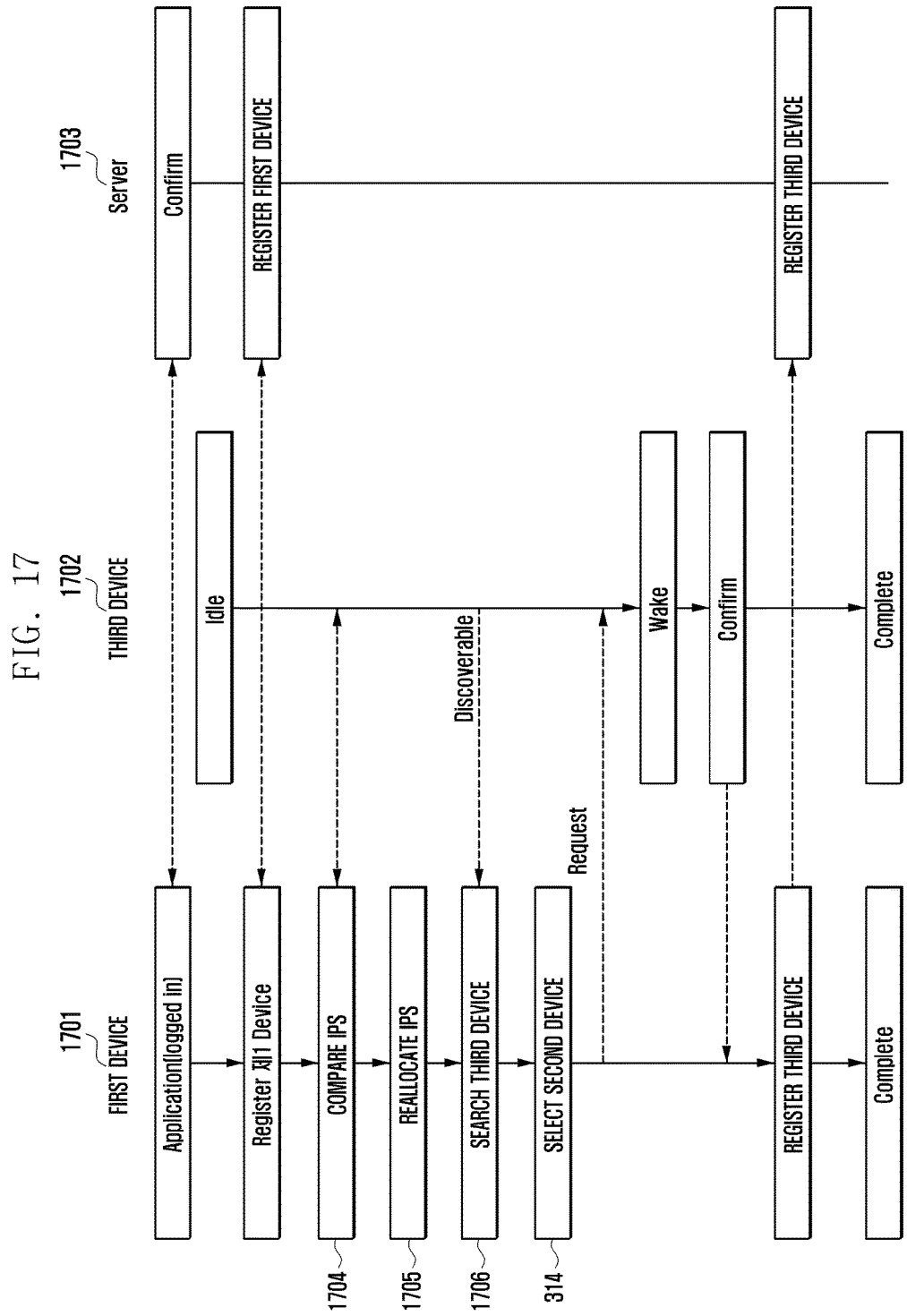
FIG. 17 is a procedural diagram illustrating a process in which another device in another home network is registered in a server using one of the devices in different home networks, according to an embodiment of the present invention.

FIG. 17 is a procedural diagram illustrating a process where another device in another home network is registered in a server using one of the devices in different home network, according to an embodiment of the present invention.

The process and steps of FIG. 17 is similar to that of FIG. 3, with the exception of steps 1704-1706, which are described in detail below.

When the first home network 1620 and the second home network 1630 are connected with the same server 1610, and there are no identical IPs between the IPs of the first home network 1620 and the IPs of the second home network 1630, a first device 1701 in the first home network 1620 can communicate with a third device 1702 in the second home network 1630.

The IP address allocated to the first device 1701 in the first home network 1620 is transmitted to the second home network 1630 before the first device 1701 communicates with the third device 1702, in step 1704.

Further, the IP address allocated to the third device 1702 in the second home network 1630 can be transmitted to the first home network 1620, in step 1704.

The IP address of the first home network 1620 transmitted to the second home network 1630 can be compared with the IP address allocated to the third device 1702 in the second home network 1630.

When the IP address allocated to the first device 1701 is compared with the IP allocated to the third device 1702 and the two IP addresses are the same, at least one of the two IP addresses is changed, in step 1705.

Specifically, one of the same IP addresses can be reallocated to another IP address.

If the IP address allocated to the first device 1701 is different from the IP address allocated to the third device 1702, the IP addresses remain unchanged.

If the IP address allocated to the first device 1701 is different from the IP address allocated to the third device 1702, the first device 1701 can communicate with the third device 1702, in step 1706.

The process after step 1706 is the same as that described above with respect to FIG. 3.

Figure 18:
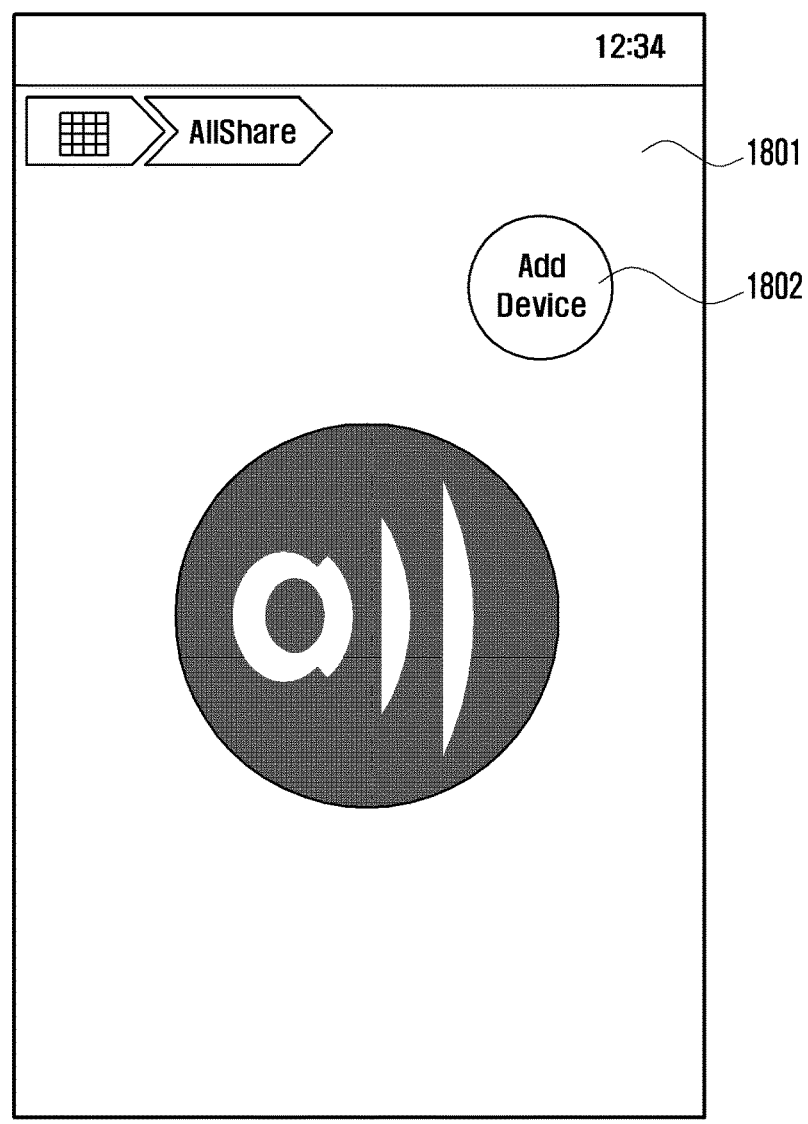
FIG. 18 illustrates a search icon for finding devices in a first home network and a second home network in a display of a first device, according to an embodiment of the present invention.
Figure 19:
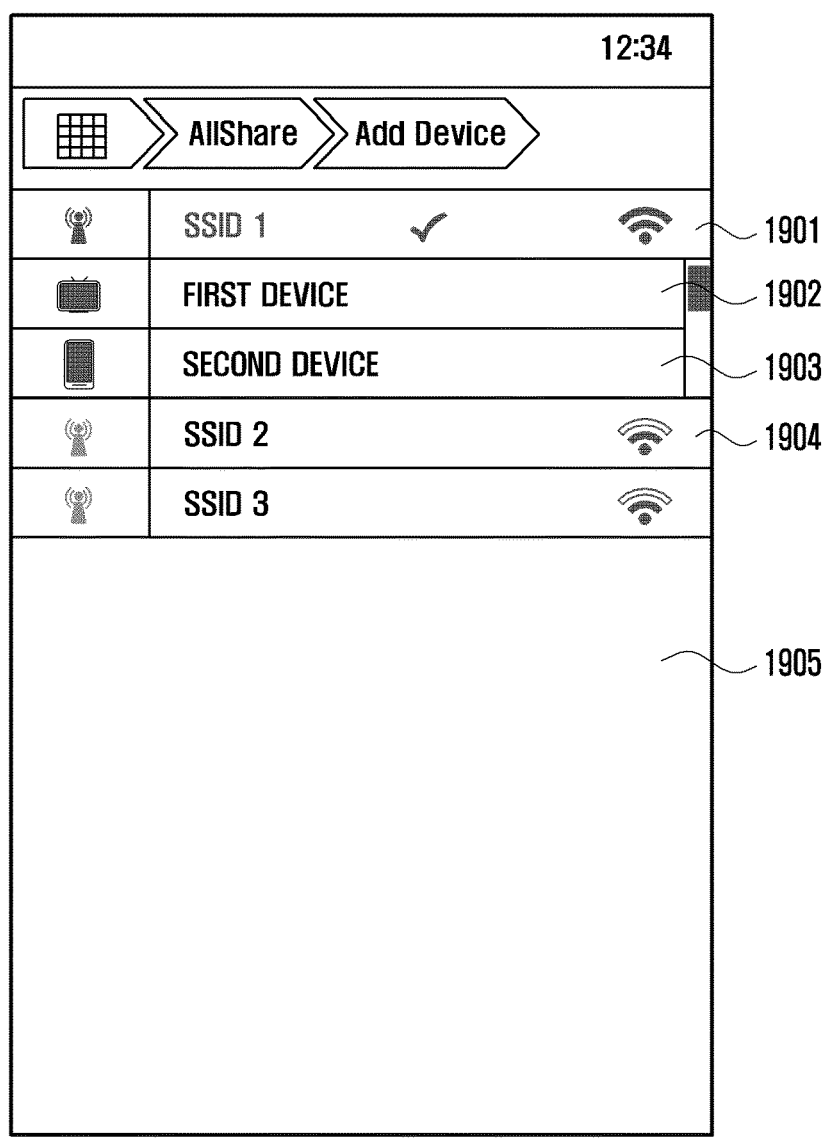
FIG. 19 illustrates a list of other devices in a first home network and a list of other devices in a second home network, according to an embodiment of the present invention.
Figure 20:
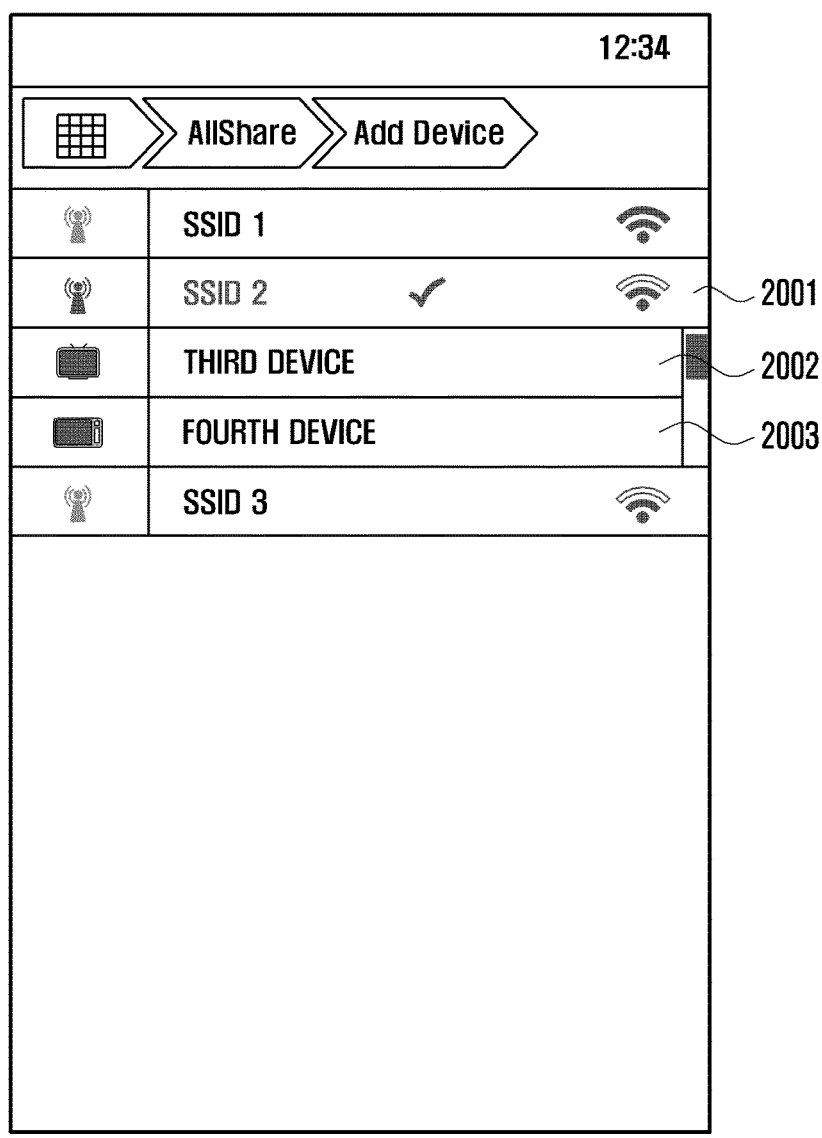
FIG. 20 illustrates lists of other devices in a second home network in a display of the first device, according to an embodiment of the present invention.

FIGS. 18 to 20 relate to the embodiment of the present invention described with respect to FIG. 17.

FIG. 18 illustrates a search icon for finding devices in a first home network and a second home network in a display of a first device, according to an embodiment of the present invention.

If a search icon 1802 in a display 1801 of the first device 1701 is selected, the first device 1701 obtains the list of devices in the first home network 1620 and the list of other devices in the second home network 1630.

FIG. 19 illustrates a list of devices in a first home network and a list of other devices in a second home network, according to an embodiment of the present invention.

If an icon 1901 of the first home network 1620 is selected, a first device 1902 and a second device 1903 connected to the first home network 1620 are displayed in the display 1905 of the first device.

The first home network 1620 connects to the second home network 1630 connected with the server 1703, and the icon 1901 indicating the first home network 1620 and an icon 1904 indicating the second home network 1630 are displayed in a display 1905 of the first device 1701.

Referring to FIG. 19, the server 1703 includes the first home network 1620 and the second home network 1630, and each home network 1620 and 1630 includes devices.

Hence, each of the devices can communicate with each other.

FIG. 20 illustrates a list of devices in a second home network in a display of the first device, according to an embodiment of the present invention.

As illustrated in FIG. 17, when the IP addresses allocated in the first home network 1620 do not collide with the IP addresses allocated in the second home network 1630, a list of other devices 2002 and 2003 can be displayed in the display 1950 of the first device 1701.

Specifically, when an icon 2001 of the second home network 1630 is selected, the list of other devices 2002 and 2003 can be displayed in the display 1905 of the first device 1701.

For example, if the third device 2002 shown in the display 1950 of the first device 1701 is selected, the first device 1701 can communicate with the third device 1702 and obtain identification information from the third device 1702.

The first device 1701 transmits the obtained identification information to the server 1703 to request that the third device 1702 be registered in the server 1703.

The server 1703 can receive identification information of the third device 1702 and allow registration of the third device 1702.

Figure 21:
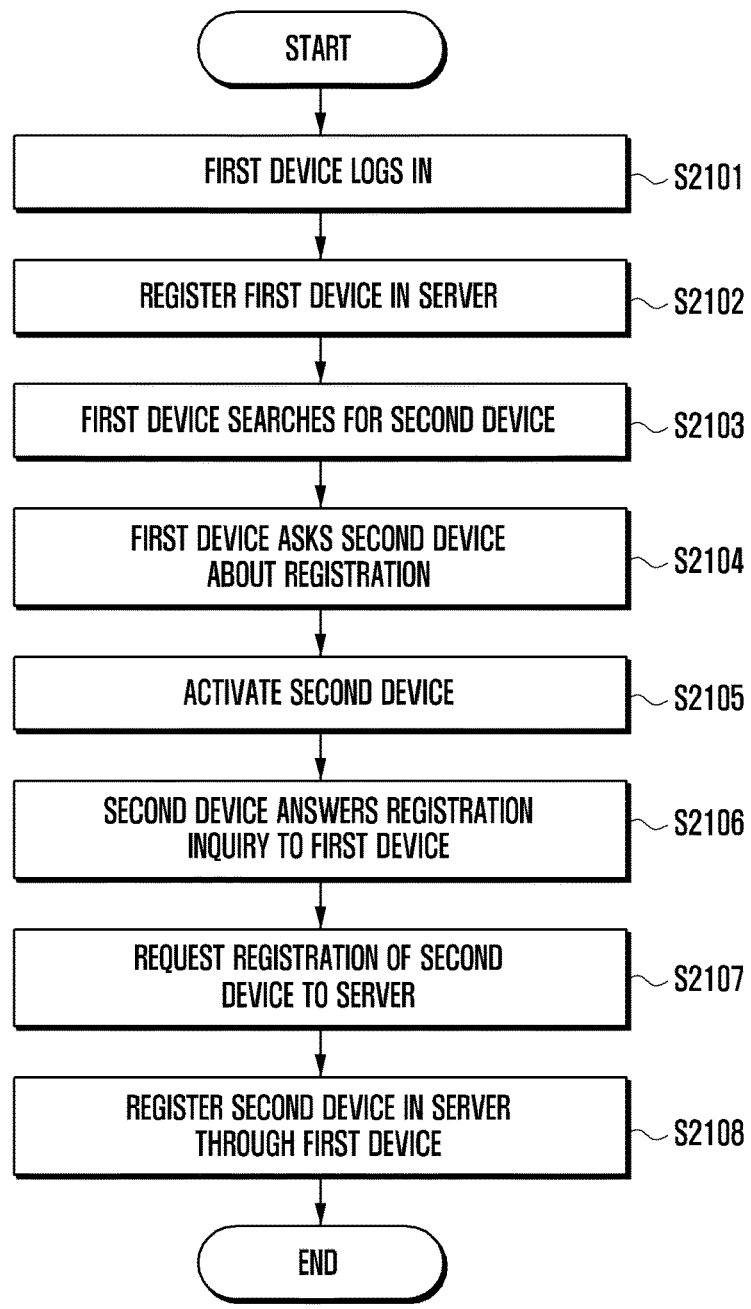
FIG. 21 is a flowchart illustrating a process of registering another device in a server using one of devices in a home network, according to an embodiment of the present invention.

FIG. 21 is a flowchart illustrating a process of registering another device in a server using one of devices in a home network, according to an embodiment of the present invention.

Referring to FIG. 21, the first device 310 can connect to the server using an application, in step S2101.

If the first device 310 connects to the server 330, the server asks the first device 310 for an ID or a password.

For example, a pop-up window, where the ID or the password is inputted, can be activated in the display of the first device 310, and the ID or the password can be inputted in the pop-up window.

The server 330 receives the inputted ID or password, and compares the inputted ID or password with the pre-stored ID or password. If the two IDs or passwords are the same, the connection of the first device 310 is allowed.

The first device 310 requests registration of the first device 310 by transmitting identification information of the first device 310 to the server 330, and the server 330 receives the registration request and allows registration of the first device 310, in step S2102.

The second device 320 periodically transmits a signal indicating the second device 320.

The first device 310 and the second device 320 are positioned within a certain area, the first device 310 senses the signal of the second device in step S2103, and communicates with the second device 320.

The first device 310 asks the second device 320 about registration of the second device 320 with the server 330, in step S2104.

When the second device 320 receives the inquiry request, the state of the second device 320 is changed from an inactivated state to an activated state, in step S2105.

In the inactivated state, it is difficult for the second device 320 to transmit identification information of the second device 320 to the first device 310, and thus, the state is changed to the activated state.

The user of the second device 320, or the one having the authority to use the second device 320, can check the inquiry about the registration and allow registration of the second device 320, in step S2106.

Further, the data of the first device 310 received from the first device 310 is compared with the data already stored in the storage unit 210, and if the two sets of data are the same, the second device 320 can transmit an answer to the inquiry about registration of the second device 320 to the first device 310.

If the first device 310 receives data allowing registration of the second device 320 from the second device 320, the first device 310 transmits identification information of the second device 320 to the server 330, and inquires about registration of the second device 320, in step S2107.

The server receives the registration inquiry from the first device 310 and allows registration of the second device 320, in step S2108.

More specifically, the server 330 compares identification information of the first device received from the first device 310 with identification information of the first device stored in the storage unit 210, and if the two sets of information are the same, the server 330 allows registration of the second device 320.

The controller can control the registration process.

FIG. 22 is a flowchart illustrating a process in which a second device requests a password from a first device when the first device connects to the second device, according to an embodiment of the present invention.

FIG. 22 includes steps that are similar to those of FIG. 21, with the exception of steps inquiring about a password and inputting the password.

Referring to the flowchart of FIG. 22, the first device 1201 can connect to the server 1203 through the application, in step S2201.

If the first device 1201 connects to the server 330, the server 330 asks the first device 1201 about the ID or password.

For example, a pop-up window, where the ID or the password is inputted, is activated in the display of the first device 1201, and the ID or the password can be inputted in the pop-up window.

The server 1203 receives the inputted ID or password, and if the inputted ID or password coincides with the already stored ID or password, the server 1203 allows connection of the first device 1201.

The first device 1201 requests registration of the first device 310 by sending identification information of the first device 1201 to the server 1203, and the server 1203 receives the registration request and allow registration of the first device 1201, in step S2202.

The second device 1202 periodically transmits a signal indicating the second device 1202.

The first device 1201 and the second device 1202 are located within a certain area, and the first device 1201 senses the signal of the second device in step S2203, and communicates with the second device 1202.

The first device 1201 asks the second device 1202 about registration of the second device 1202 with the server 1203, in step S2204.

When the inquiry request is received, the state of the second device 1202 is changed from an inactivate state to an activated state, in step S2205.

In the inactivated state, it is difficult for the second device 1202 to transmit identification information of the second device 1202 to the first device 1201, and thus, the state of the second device 1202 is changed to the activated state.

The second device 1202 asks the first device 1201 about the password in step S2206. A window, where the password can be inputted, is displayed in the display of the first device 1201.

A user can check the password request from the first device 1201 and input the password in the window displayed in the display of the first device.

If the password is inputted in the window and the transmission button is selected, the password is transmitted to the second device 1202, in step S2207.

The second device checks the password and receives the registration request of the first device 1201, in step S2208.

Further, if the password coincides with the password stored in the storage unit 210, the second device 1202 receives the registration request of the first device 1201.

A user of the second device 1202, or the one having the authority to use the second device 1202, checks the registration inquiry and allows registration of the second device 1202.

Further, if the data of the first device 1201 received from the first device 1201 is compared with the data already stored in the storage unit 210 and the two sets of data are the same, the second device 1202 transmits the answer to the registration inquiry of the first device 1201 to the first device 1201, in step S2209.

If the first device receives data allowing registration of the second device 1202 from the second device 1202, the first device 1201 transmits identification information of the second device 1202 to the server 1203 and inquires about registration of the second device 1202, in step S2210.

The server 1203 checks a registration inquiry received from the first device 1201 and allows registration of the second device 1202, in step S2211.

More specifically, the server 1203 compares the identification information of the first device received from the first device 1201 with the identification information of the first device stored in the storage unit 210, and if the two sets of information are the same, the server 1203 allows registration of the second device 1202.

The controller 230 can control the registration process and the process of inquiring about the password.

FIG. 23 is a flowchart illustrating a process in which another device in another home network is registered in a server using one of the devices in different home networks, according to an embodiment of the present invention.

FIG. 23 provides steps that are similar to those of FIG. 21, with the exception of the step of comparing the IP allocated in the first home network with the IP allocated in the second home network.

Referring to the flowchart of FIG. 23, the first device 1701 connects to the server 1703 using an application, in step S2301.

If the first device 1701 connects to the server 1703, the server 1703 asks the first device about the ID or the password.

For example, a pop-up window, where the ID or the password is inputted, is activated in the display of the first device 1701, and the ID or the password is inputted in the pop-up window.

The server 1703 receives the inputted ID or password, and if the inputted ID or password coincides with the already stored ID or password, the server 1703 allows connection of the first device 1701.

The first device 1701 requests registration of the first device 1701 by transmitting identification information of the first device 1701 to the server, and the server receives the registration request and allows registration of the first device 1701, in step S2302.

The IP address allocated in the first home network can be compared with the IP address allocated in the second home network 1630, in step S2303.

The IP addresses are compared because it is possible for the first home network 1620 and the second home network 1630 to be independently constituted, and for each home network to allocate the same IP address to devices.

In the independent constitution of the home network, the IP address of the first device 1621 connected to the first home network 1620 can coincide with the IP address of the third device 1631 connected to the second home network 1630.

The IP addresses are compared with each other, and when the same IP address exists, one of the two addresses is reallocated to another IP address, in step S2304.

Through the reallocation process, the IP address allocated in the first home network 1620 is constituted to be different from the IP address allocated in the second home network 1630.

Home networks are connected to the same server and devices can communicate with each other in the home network, and thus, the first device 1701 detects and connects to the third device 1702, in step S2305.

The first device 1701 asks the third device 1702 about registration of the third device 1702, in step S2306.

If the third device 1702 receives the inquiry request, the state of the third device 1702 is changed from the inactivated state to the activated state, in step S2307.

In the inactivated state, it is difficult for the third device 1702 to transmit identification information of the third device 1702 to the first device 1701, and thus, the state of the third device 1702 is changed to the activated state.

A user of the third device 1702, or one having the authority to use the third device 1702, checks the registration inquiry and allows the registration of the third device 1702.

Further, the third device 1702 compares the data of the first device 1701 received from the first device 1701 with the data pre-stored in the storage unit 210, and if the two sets of data are the same, the third device 1702 transmits the answer to the registration inquiry of the first device 1701 to the first device 1701, in step S2308.

If the first device 1701 receives data allowing registration of the third device 1702 from the third device 1703, the first device 1701 transmits identification information of the third device 1702 to the server 1703 and inquires about registration of the third device 1702, in step S2309.

The server 1703 receives the registration inquiry from the first device 1701 and allows registration of the third device 1702, in step 2310.

More specifically, the server 1703 compares identification information of the first device 1701 received from the first device 1701 with identification information of the first device 1701 stored in the storage unit 210, and if the two sets of information are the same, the server 1703 allows registration of the third device 1702.

The controller 230 can control the registration process and the process of comparing IP addresses and reallocating IP addresses.

According to embodiments of the present invention, a device can be registered in a server through another of a plurality of devices positioned in a home network. Further, a device positioned in a first home network can be registered in the server through another device positioned in a second home network.

While the invention has been shown and described with reference to certain embodiments thereof, it will be understood by those skilled in the art that various changes in form and detail may be made therein without departing from the spirit and scope of the invention as defined by the appended claims.

What is claimed is:

1. A method for registering a device in a server, the method comprising the steps of:
   connecting a first device to the server;
   sending a message related to registration of a second device with the server, from the first device to the second device;
   receiving data indicating allowance of the registration at the first device from the second device; and
   in response to the allowance of the registration of the second device with the server, registering the second device with the server by transmitting identification information of the second device from the first device to the server, and storing the identification information of the second device in the server;
   wherein the first device and the second device are disposed within at least one network connected to the server.

2. The method of claim 1, wherein the identification information comprises at least one of a unique number of the second device, a product name of the second device, and a serial number of the second device.

3. The method of claim 1, further comprising:
   searching for the second device in the at least one network by the first device.

4. The method of claim 1, further comprising:
   connecting the first device to the second device and activating the second device.

5. The method of claim 1, further comprising:
   receiving an inquiry about a password at the first device from the second device, when the first device connects to the second device.

6. The method of claim 1, further comprising:
   receiving the identification information of the second device at the first device from the second device.

7. The method of claim 1, further comprising:
   receiving a setting that limits a connection of the second device at the first device.

8. The method of claim 1, further comprising:
   registering the first device in the server.

9. The method of claim 8, further comprising:
   generating an account of the first device in the server after registration of the first device in the server, and connecting a plurality of devices to the account.

10. The method of claim 1, further comprising:
    receiving an inquiry about a password at the first device from the second device.

11. The method of claim 10, further comprising:
    transmitting the password from the first device to the second device.

12. The method of claim 1, further comprising:
    comparing an IP address allocated to the first device with an IP address allocated to the second device.

13. The method of claim 12, wherein the second device is disposed in a home network that is different from a home network of the first device.

14. The method of claim 12, further comprising:
    changing at least one of the IP address of the first device and the IP address of the second device when the IP address of the first device is the same as the IP address of the second device.

15. A device comprising:
    a communication unit; and
    a controller that connects the communication unit to a server, sends a message related to registration of another device with the server to the other device, receives data indicating allowance of the registration from the other device, and, in response to the allowance of the registration of the other device with the server, transmits identification information of the other device to the server through the communication unit so that the other device is registered in the server;
    wherein the device and the other device are disposed within at least one network connected to the server.

16. The device of claim 15, further comprising:
    a storage unit that stores the identification information of the other device.

17. The device of claim 15, wherein the identification information comprises at least one of a unique number of the other device, a product name of the other device, and a serial number of the other device.

18. The device of claim 15, wherein the controller controls registration of the other device in the server.

19. The device of claim 15, wherein the controller controls reception of an inquiry about a password from the other device when the device connects to the other device.

20. The device of claim 19, wherein the controller controls transmission of the password from the device to the other device.

* * * * *